United States Patent [19]
Desrochers et al.

[11] Patent Number: 6,137,403
[45] Date of Patent: Oct. 24, 2000

[54] SASH SENSOR AND METHOD OF SENSING A SASH USING AN ARRAY OF MULTIPLEXED ELEMENTS

[75] Inventors: Eric M. Desrochers, Nashua, N.H.; Steven J. Gaul, Haverhill, Mass.; Herbert A. Winters, Center Barnstead, N.H.

[73] Assignee: Phoenix Controls Corporation, Newton, Mass.

[21] Appl. No.: 09/208,687

[22] Filed: Dec. 10, 1998

[51] Int. Cl.$^7$ .................................................. G08B 21/00
[52] U.S. Cl. .................. 340/540; 340/545.1; 340/545.2; 340/545.3; 340/545.9; 340/547; 340/686.1
[58] Field of Search .............................. 340/545.1, 545.2, 340/547, 545.3, 545.9, 540, 686.1

[56] References Cited

U.S. PATENT DOCUMENTS

| | | | |
|---|---|---|---|
| 3,859,624 | 1/1975 | Kriofsky et al. | 340/10.42 |
| 4,528,898 | 7/1985 | Sharp et al. | 98/115.3 |
| 4,586,260 | 5/1986 | Baxter et al. | 33/125 C |
| 4,706,553 | 11/1987 | Sharp et al. | 98/115.3 |
| 4,841,225 | 6/1989 | Meyer | 324/61 R |
| 4,893,551 | 1/1990 | Sharp et al. | 98/115.3 |
| 5,008,661 | 4/1991 | Raj | 340/825.54 |
| 5,056,049 | 10/1991 | O'Neill | 364/562 |
| 5,090,304 | 2/1992 | Egbers et al. | 454/59 |
| 5,092,227 | 3/1992 | Ahmed et al. | 454/61 |
| 5,117,746 | 6/1992 | Sharp | 454/61 |
| 5,248,989 | 9/1993 | Murdoch | 343/841 |
| 5,347,263 | 9/1994 | Carroll et al. | 340/941 |
| 5,347,754 | 9/1994 | Jacob | 49/13 |
| 5,534,859 | 7/1996 | Meyer | 340/870.37 |

FOREIGN PATENT DOCUMENTS

| | | | |
|---|---|---|---|
| 0 541 864 A1 | 5/1993 | European Pat. Off. | B08B 15/02 |
| WO 85/03346 | 8/1985 | WIPO | G01B 7/03 |

OTHER PUBLICATIONS

TIRIS Products and Technology, "Accessories," Texas Instruments, http://www.ti.com/mc/docs/readac.htm, 1996.
TIRIS Products and Technology, "Readers and Antennas," Texas Instruments, http://www.ti.com/mc/docs/micro_rd.htm, 1996.
TIRIS Products and Technology, "Transponders," Texas Instruments, http://www.ti.com/mc/docs/tripod.htm, 1996.
"MicroStamp Engine SOIC: Modulated Backscatter (MBS) Version," Micron Communications, Inc., Data Sheet 1997.
"HT RM800 Family: Hitag Long Range Reader Module Hardware," Mikron Identification/Philips, Data Sheet Product Specification, Revision 5.0, Feb. 1997.
"Designing Detectors for RF/ID Tags," Hewlett Packard, Application Note 1089, 1997.
L. Reindl, W. Ruile, "Programmable Reflectors for SAW–ID–Tags," Siemens AG, Corporate Research and Development, Munich, Germany, Ultrasonics Symposium, 1993, pp. 125–130.
ID Technologies, "RFID Read Ranges," Micron Communications, Inc., http://www.id–tech.com/range.htm, 1997.
ID Technologies, "All about RFID," Micron Communications, Inc., http://www/id–tech.com/rfid.htm.
"How RFID Systems Work," Transponder News, http://rapidttp.com/transponder/newswork.html, Jan. 13, 1996.
"Multiple Article Scanning," Transponder News, http://rapidttp.com/transponder/multitag.html.
Stan Gunnarsson, "Microwave ID Pays Off in the Distribution Chain," Transponder News, http://rapidttp.com/transponder/confiden.html, Dec., 1996.

(List continued on next page.)

*Primary Examiner*—Glen Swann
*Attorney, Agent, or Firm*—Wolf, Greenfield & Sacks, P.C.

[57] ABSTRACT

A fume hood sash sensor uses multiplexed sensors to measure sash position. The sensor transmitter or receiver elements may be multiplexed. Furthermore, the sensor may employ passive, passive remote powered transponder, or powered transponder elements on the sashes to measure sash position.

50 Claims, 36 Drawing Sheets

OTHER PUBLICATIONS

Matthew Reynolds, "Microwave RFID:Passive Scattering and Active Transponders: Introduction," MIT, http://physics.www.media.mit.edu/~matt/scattering.html.

Matthew Reynolds, "Microwave RFID:Passive Scattering and Active Transponders: Modulation Techniques for Reliability, Security, and Multiple Access," MIT, http://physics.www.media.mit.edu/~matt/modulation.html.

Matthew Reynolds, "Microwave RFID:Passive Scattering and Active Transponders: Roots," MIT, http://physics.www.media.mit.edu/~matt/theory.html.

Matthew Reynolds, "Microwave RFID:Passive Scattering and Active Transponders: Power Issues for Passive and Active Tags," MIT, http://physics.www.media.mit.edu/~matt/power.html.

Matthew Reynolds, "Microwave RFID:Passive Scattering and Active Transponders: A Prototype Backscatter System," MIT, http://physics.www.media.mit.edu/~matt/backscatter.html.

"MicroStamp 10: MSTMDL256X231OS Data Sheet," Micron Communications, Inc., 1997.

"MicroStamp 10 ML: MSMMDL256X231OS L Data Sheet," Micron Communications, Inc., 1997.

"MicroStamp RIC Brochure," Micron Communications, Inc., 1997.

"MicroStamp Price List," Micron Communications, Inc..

"Ambit Mobile Asset Control System Brochure," Micron Communications, Inc., 1997.

"Ambit Mobile Asset Control System Data Sheet," Micron Communications, Inc..

"Ambit Mobile Asset Control System Price List," Micron Communications, Inc..

"MicroStamp Engine Brochure," Micron Communications, Inc., 1997.

"Micron Full–Line Product Brochure," Micron Communications, Inc., 1997.

"MicroTag UltraThin Tag & Specifications," Micron Communications, Inc.

"MicroTag Proximity Key Fob Tag & Specifications," Micron Communications, Inc.

"MicroTag Square Asset Tag & Specifications," Micron Communications, Inc.

"MicroTag Development Kit," Micron Communications, Inc.

"MicroTag Readers & Specifications," Micron Communications, Inc.

"MicroTag Proximity Badge & Specifications," Micron Communications, Inc.

"MicroTag External RFID Antenna & Specifications," Micron Communications, Inc.

"MicroTag Large Disk Asset Tag & Specifications," Micron Communications, Inc.

"MicroTag Proximity Card & Specifications," Micron Communications, Inc.

"MicroTag Small Disk Asset Tag & Specifications," Micron Communications, Inc.

"MicroTag Price List," Micron Communications, Inc.

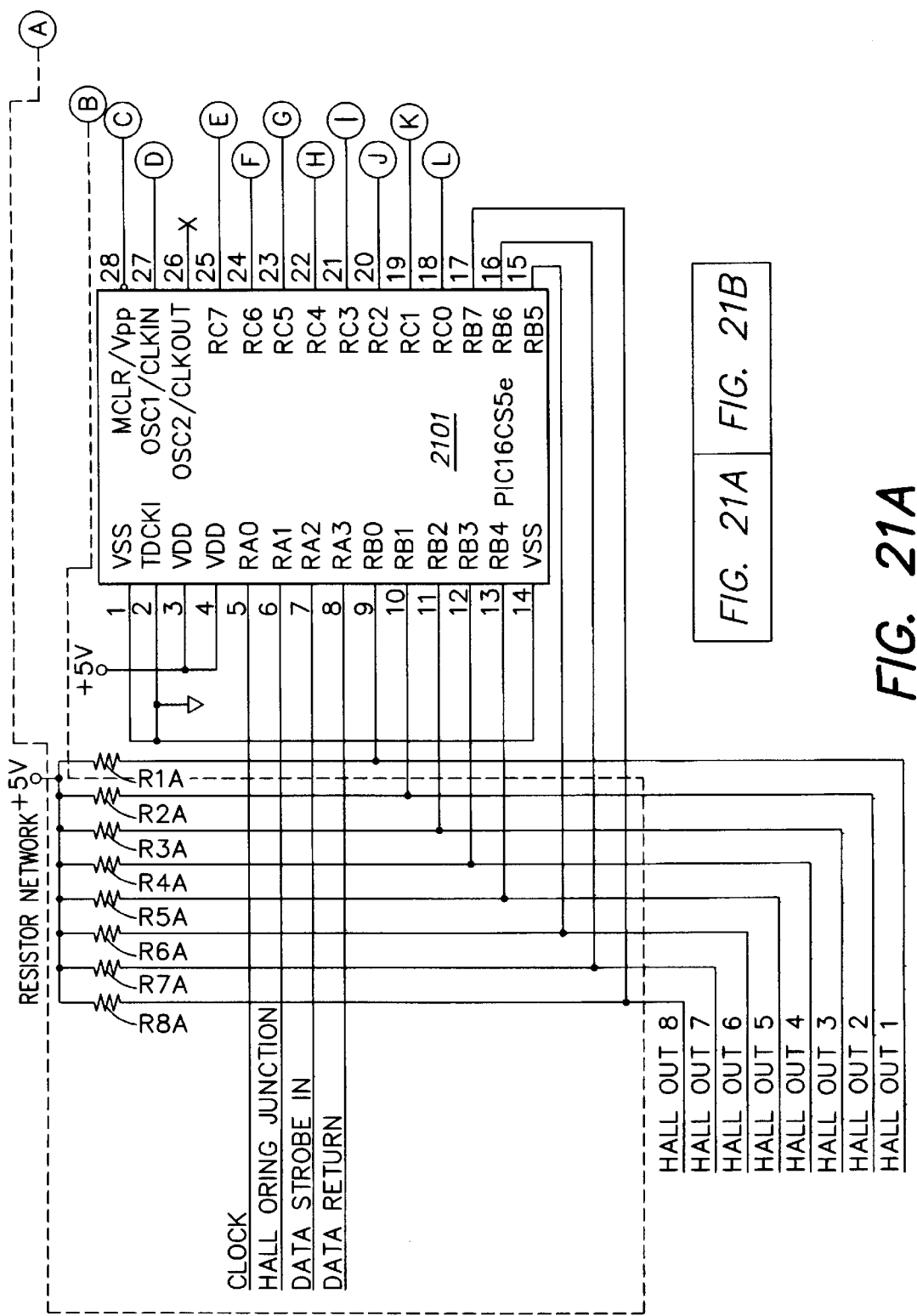

SASH SENSOR AND METHOD OF SENSING A SASH USING AN ARRAY OF MULTIPLEXED ELEMENTS

FIELD OF THE INVENTION

This invention relates to laboratory fume hoods and more specifically to apparatus for detecting the extent to which the sashes of a fume hood are open.

BACKGROUND OF THE INVENTION

A laboratory fume hood is a ventilated enclosure where harmful materials can be handled safely. The hood captures contaminants and prevents them from escaping into the laboratory by using an exhaust blower to draw air and contaminants in and around the hood's work area away from the operator so that inhalation of and contact with the contaminants are minimized. Access to the interior of the hood is through an opening which is closed with one or more sashes which may slide vertically, horizontally, or in both directions to vary the opening into the hood. Sashes may be referred to as vertical, horizontal or combination, corresponding to the direction or directions in which they slide.

A conventional fume hood consists of an enclosure which forms five sides of the hood and a hood sash or sashes which slide horizontally and/or vertically to provide a variable-sized opening on the sixth side. In this type of hood, the amount of air exhausted by the hood blower is essentially fixed and the velocity of air flow through the hood opening, or face velocity, increases as the area of the sash opening decreases. As a result, the sash must be left open an appreciable amount even when the hood is not being used by an operator to allow air to enter the hood opening at a reasonable velocity. However, as is discussed in U.S. Pat. Nos. 4,528,898 and 4,706,553, incorporated herein by reference, the amount of energy required to deliver "make up air" may be reduced by monitoring the sash position, and thus the opening in the fame hood and by adjusting the blower and thus the exhaust volume of the hood linearly in proportion to the change in opening size in order to achieve a substantially constant face velocity. In these patents, the fume hood opening was covered by a single sash which opened in the vertical direction.

U.S. Pat. Nos. 4,893,551 and 5,117,746, incorporated herein by reference, discuss additional styles of fume hoods wherein two or more sashes are mounted to slide horizontally on at least two tracks which are located on the top and bottom of the sash opening and also fume hoods which have sashes mounted on tracks for horizontal movement, which tracks are, in turn, mounted on a sash frame which may be moved vertically, i.e., a combination sash having a combination sash frame.. These patents also discuss techniques which may be utilized with such sashes to determine the sash opening. As is noted in these patents, with two or more sashes, absolute position of the sashes is not sufficient information by itself to indicate the open area of the hood. Instead, it is the relative position of the two or more sashes of the hood which determine the total open sash area. The problem becomes even more complex where four sashes are mounted on two tracks, which is a very common configuration, or where the hood is being moved both horizontally and vertically.

In the U.S. Pat. No. 4,893,551, the sash opening detection function is performed, in general, by having a source of radiation, and a detector for such radiation, and by mounting the source and detector relative to each other and to the sashes such that the amount of radiation detected is proportional to the uncovered portion of the opening. For preferred embodiments in the patent, various discrete magnetic or optical emitters and sensors mounted adjacent to or on the sashes are utilized to determine the fume hood opening.

However, the detectors, and in some cases the sources, for these preferred embodiments utilize devices which may need to be installed inside or near the opening of the fume hood. This results in a need for careful sealing of these devices with the attendant cost and complexity. The devices disclosed in the patent may also require an enclosure having a reasonable thickness, particularly when sealing is required. This can cause problems in locating such devices on the sashes of some hoods. In particular, such devices may not fit within the clearance between the sashes or between the sashes and the frame of the hood.

Present methods for sash position sensing include the use of assemblies of sensor elements mounted to the moveable sashes whose position is desired to be detected. Each assembly of sensor elements is electrically connected to external electronics through a sensor cable. Although this prior art is preferred over other available technology, such electrical connection methods for sash position sensing are less than optimal, particularly for cases where sensing is to be provided for horizontal sash, combination sash, or walk-in hood types. Routing the horizontal sash sensor cable presents difficulties related to either the establishment of operative pivot points or mounting a take-up reel for cable movement. The issues faced include both real and perceived reduced reliability over time due to cable wear, difficulties in installation, and the poor aesthetics of exposed cable that moves in a pendulous manner.

Other issues with conventional technology have been with the thickness of the sensor and magnet bars, given the increasing trends for tighter hood construction and, thus, reduced spacing between sashes from one track to another. Alternatively, a ¾" limitation on maximum distance between the surface of the sensor bar magnet and that of the reed switch sensor assembly is occasionally an issue with larger, more loosely designed hoods, so improvements in sensor sensitivity is desirable. See U.S. Pat. No. 4,893,551.

SUMMARY OF THE INVENTION

The present invention may be embodied in a sash position sensor for a sash in a frame, comprising an array of time-multiplexed sensor elements; and at least one passive element which affects a signal detected by the array of sensor elements. According to another aspect of the invention, the present invention may be embodied as a method of sensing a position of a sash within a frame, the method comprising arranging an array of sensors and passive elements in a pattern; varying the pattern as the position of the sash changes; receiving with the array of sensors a signal indicative of the pattern; and deducing the position of the sash from the signal received.

BRIEF DESCRIPTION OF THE DRAWINGS

In the drawings, in which like reference designations indicate like elements:

FIG. 15b is a schematic drawing of the sensor strips of FIG. 15a;

FIG. 21A and FIG. 21B are schematic drawings of a circuit which is an alternative to those of FIGS. 5 and 20;

DETAILED DESCRIPTION

Figure 1:
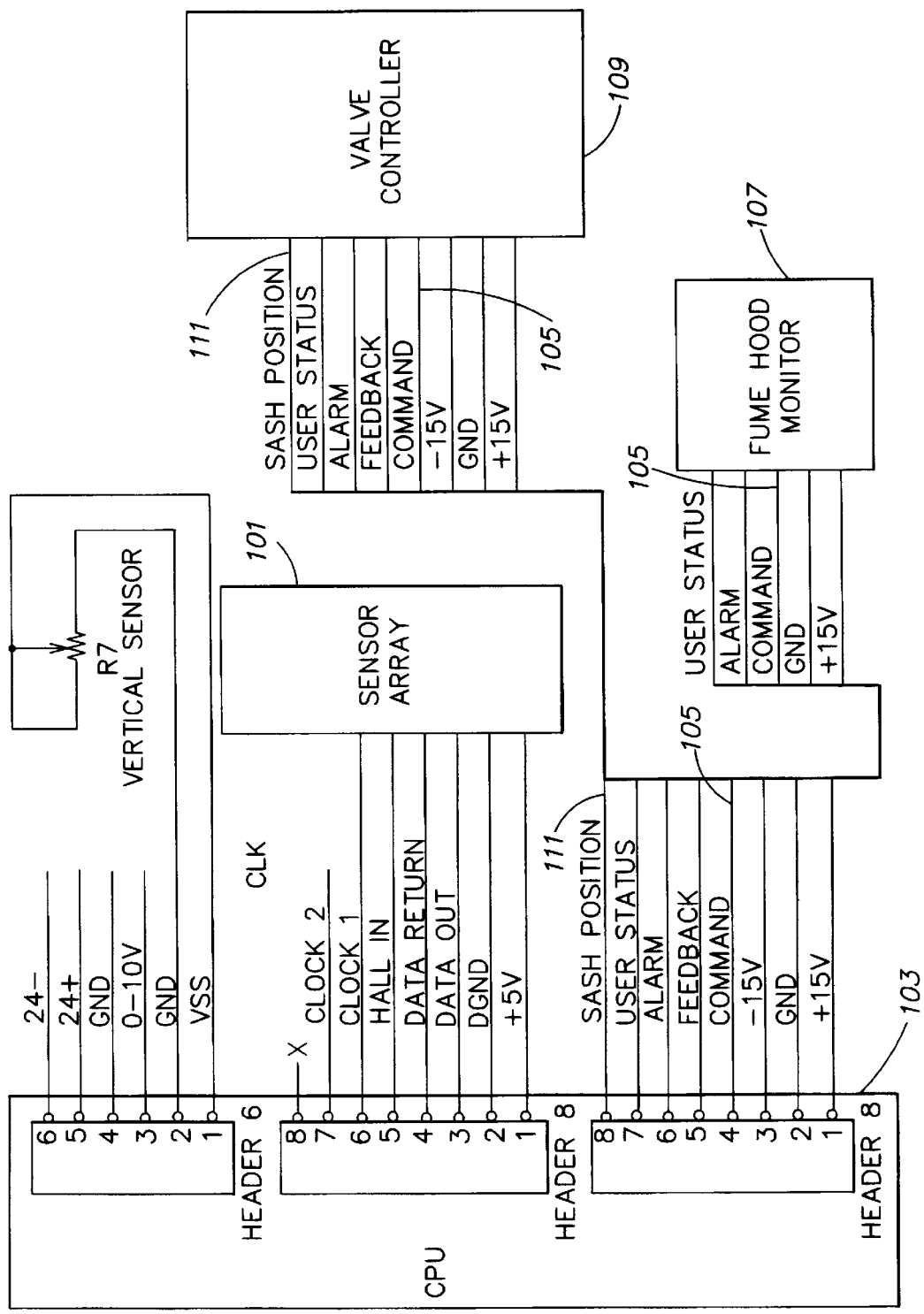
FIG. 1 is a schematic drawing of a circuit in which the invention is embodied.

The approach of these inventors employs a plurality of sensors and one or more passive devices whose presence can be detected by the sensors disposed along a direction of motion of a sash whose position is to be measured. The sensors may directly detect the presence of magnetic or electric fields produced by the one or more indicator devices, or may detect an interaction between the one or more indicator devices and an ambient magnetic or electric field. The ambient field may be externally supplied as part of the system.

Multiplexed sensor array technology brings to sash position sensing a number of advantages. These advantages relate to power consumption, sensor array size, position sensing sensitivity and position sensing accuracy.

By multiplexing sensor operation, continuous power consumption may be limited to as little as the power required by but one sensor element if the multiplexing method activates only one sensor element at each point in time. Other multiplexing methods which exhibit power savings, but with higher power consumption are also possible. As a result, very large arrays can be constructed without any penalty in power consumption. Keeping power consumption low helps minimize the cost of the power supply; keeping power consumption relatively constant for a range of sensor array sizes permits the use of one power supply of a fixed size for a variety of applications.

Maintaining a small, constant power consumption level permits realization of sensor arrays of substantial size. The sensor array approach to sash sensing taught herein may thus have application to other large-scale position measurement problems. For example, digital vernier technologies are known, as described in U.S. Pat. Nos. 4,586,260, 5,534,859 and 4,841,225. These technologies depend upon the interaction between an active detector device and a distribution of electrodes. The electrodes generally populate a flat substrate whose length determines the maximum measurement range possible. Such conventional technologies count pulses produced as electrodes and detectors pass each other. Conventional technologies must hold the current count in a memory, since each measurement is made relative to a starting count. Conventional devices use volatile memory types to store the count. Also, the working distance between the active detector device and the distribution of electrodes is very small in conventional devices.

In contrast, the present invention needs no memory to store a relative count because an absolute measurement is made. Moreover, the sensor elements and indicator devices contemplated can work over much larger working distances, up to several inches, for example.

As will be seen in the described embodiments, sensors can be Hall effect switches, reed switches, various kinds of search coils and radio frequency (RF) receivers, optical detectors, etc., depending upon the field or interaction desired to be detected. The indicator devices may include point magnets, strip magnets, passive remote powered transponders (PRPTs) such as used in RF Identification (RFID) technology, reflectors, absorbers, etc. Some indicator devices interact with an ambient field which can be generated by the sensor or an external signal source. The external field may be electric, magnetic, RF, light, etc., and may be modulated or steady state.

Exemplary embodiments are described in which the passive devices are magnets, RFID tags or the like and electrostatic devices. Although RFID tags and the like may include elements traditionally considered active, such as elements required for load switching, they are considered passive for the purposes of this discussion because they are powered remotely by a generated ambient field, rather than by batteries or other wired power source. However, the invention may use battery powered tags as well.

One exemplary embodiment of the invention, shown in FIG. 1, includes two main components, a sensor array 101 and a central processing unit (CPU board) 103. Each fume hood application employing this embodiment of the invention will include at least one CPU board 103 which may be placed on the top of the fume hood or any other convenient location and a sensor array 101. In applications of the invention to fume hoods with vertical sashes incorporating horizontal sashes, the sensor array 101 is attached to the vertical sash frame, whereas in applications using horizontal sashes in a fixed frame, the sensor array 101 is attached to the fixed frame. The sensor array 101 detects the position of a moveable sash by the detection of point magnets attached to each of the moveable sash panes. The sensor array 101 can be made on a substrate of industry standard printed circuit board material. The overall sensor array length can be determined by the skilled designer, based on what is most cost effective to fit in a standard size panel, while ensuring maximum usage of circuit elements used to sequence the sensor elements. The thickness of the printed circuit board can be 0.031", which is a common board thickness. Other thicknesses may be used to meet other manufacturability or application-specific requirements of space, durability, flexibility, etc. The sensor array assemblies will be secured to the fume hood using double-sided tape, such as that used with the conventional product of Phoenix Controls Corporation.

Hall sensors (See FIG. 5A, 501) are distributed along the sensor array 101 in ¾" increments, and are sequenced by the CPU board 103. The state of each of the Hall sensors 501 is individually determined using multiplexing to separate the information returned by each sensor while requiring only one sensor data signal line. The Hall sensor 501 state information is stored locally by the CPU board 103 after each scan or multiplex cycle. Sash opening is computed directly from the Hall sensor 501 state information. Sash opening is communicated to the fume hood monitor 107 and valve controller 109 over sash position signal line 111.

Sash opening directly affects the flow command developed by a fume hood monitor 107 and transmitted to a valve controller 109. Therefore, sash position detection must be accomplished at a rate that is negligible compared to the response time of the fume hood monitor 107, given a step change to its setpoint. A practical upper limit of response time for the sensor is 50 milliseconds. This includes the time it takes to determine the state of every Hall sensor 501 in each array 101, and the time to process the readings along with vertical sensor information so that a sash position output on a scale of 0–10 VDC is output to the fume hood monitor 107. The scale of 0–10 VDC corresponds to a sash opening of 0–100%. Alternatively, the CPU board 103 may include sufficient processing power and suitable software programming to directly compute and provide a scaled command signal to valve controller 109.

Vertical Sash Sensor functionality may be incorporated by connecting a Vertical Sash Sensor array in series with the Horizontal Sash Sensor array. This enables the Vertical Sash Sensor elements to be multiplexed by the same source used to sequence the Horizontal Sash Sensor.

Using this arrangement requires the CPU board 103 to detect the presence of each array. Detection can be done as follows. At the time of boot up for the CPU board 103, a bit can be clocked through the sensor array 101 circuitry. The number of times that the data strobe line is asserted is observed. If the data strobe line is asserted only once, only one array is present. If a second array is present, the data strobe line is asserted twice.

Figures 5A, 5B:
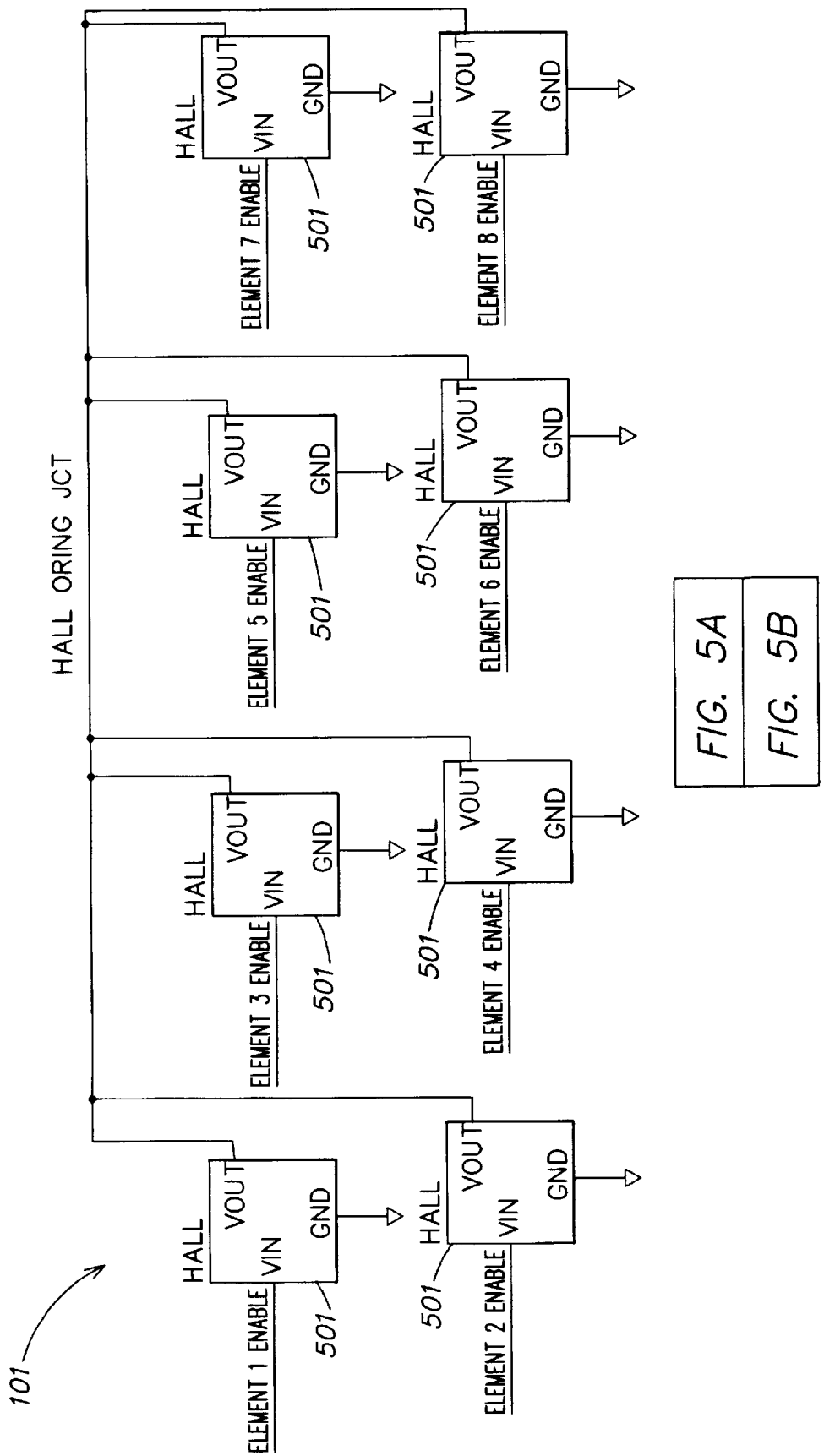
FIG. 5A and FIG. 5B are detailed schematic drawings of a sensor array useable in embodiments of the invention installed on a fume hood.
Figure 5B:
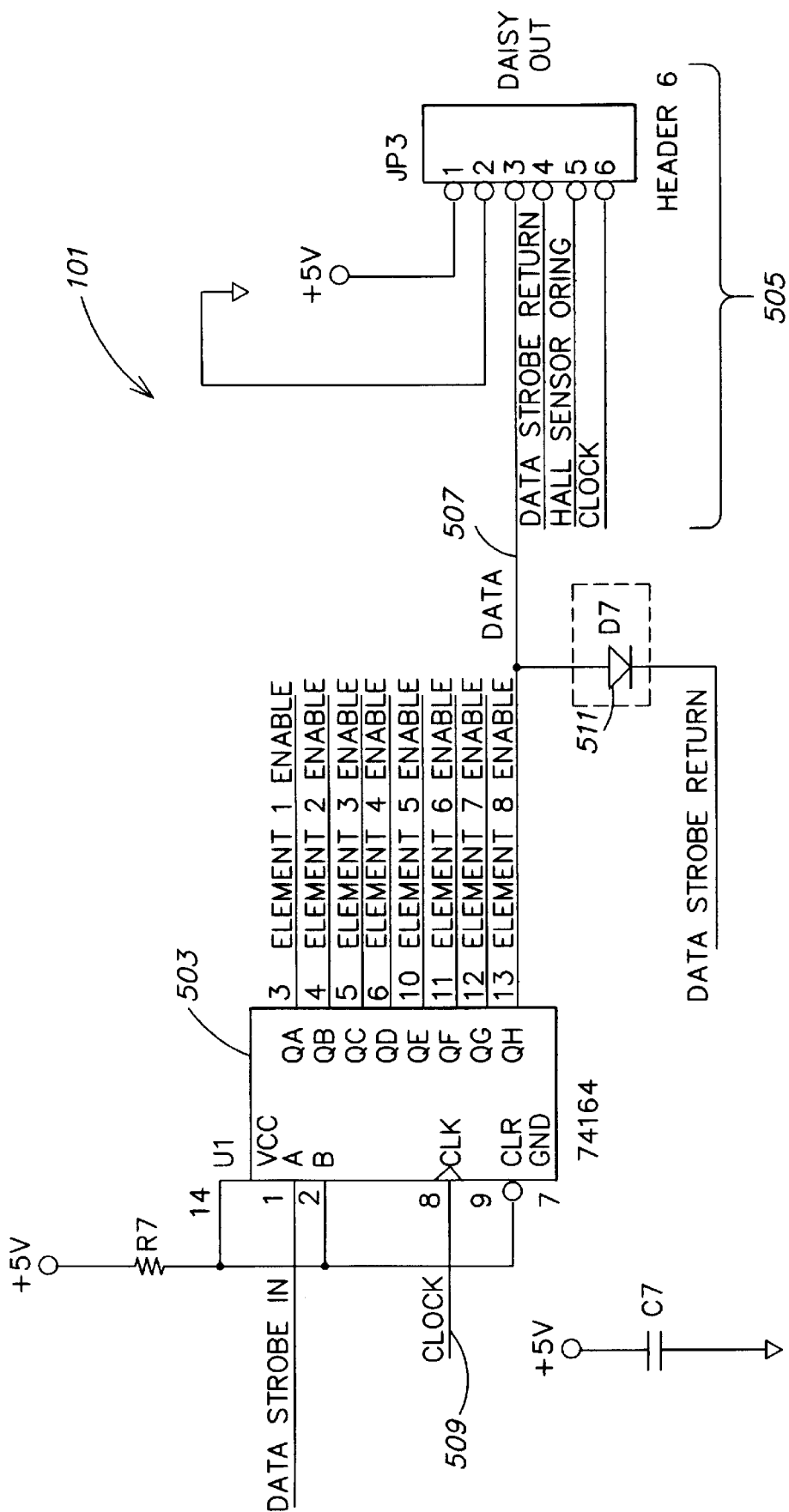

FIG. 5A illustrates, in simplified schematic fashion, the sensor array 101 circuitry. The number of sensor elements 501 and related circuits actually used derives from the size of the sash whose position is to be determined. At the end of each array of sensors is a single diode (FIG. 5B, 511), which routes data from the array (FIG. 1, 101) back to the CPU board (FIG. 1, 103). The diode permits several arrays to be interconnected.

The exemplary sash sensor embodiment is compatible with both analog and digital systems known to Phoenix Controls Corporation.

The sensor array 101 will be sequenced through a maximum of 256 discrete steps. If Vertical Sash Sensor functionality is incorporated, the sensor array 101 for the vertical sash will also be sequenced through a maximum of 256 discrete steps. Based on one sensor element placed every 0.75", this is sufficient to handle a horizontal and vertical sensor array assembly of about 16 feet having 0.75" resolution. Timing for a specific example embodiment is described below in connection with FIG. 4.

When an error condition is detected by circuits on the CPU board 103, such as the Vertical Sash Sensor input floating high or no response from one or more sensor arrays 101, the sash position output sash position signal line 111 will be forced to a value greater than 10V. In addition, the command line 105 will be forced to a value greater than 10.5V. These actions both signal the error condition and force the fume hood controller into a safe mode. The fume hood monitor 107 can also cause an audible and visual alarm to register.

The previous discussion relates to a single-CPU system. The following brief discussion relates to a multiple-CPU system, configured for master-slave operation, as shown in FIG. 2.

Figure 2:
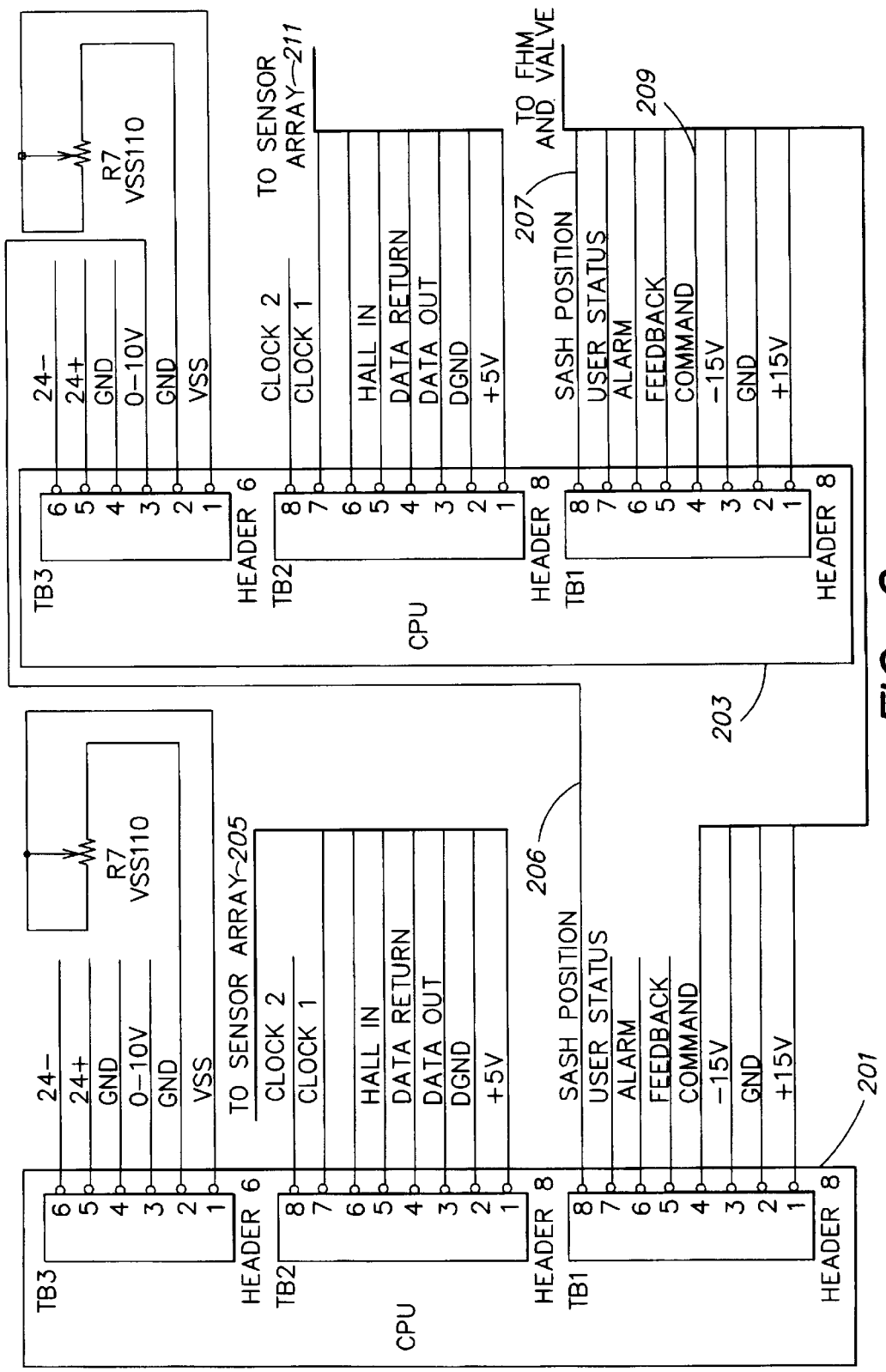
FIG. 2 is a schematic drawing of another circuit in which the invention is embodied.

Under normal operation, the sash position output 206 from one CPU board 201 that connects to the 0–10V input of another 203, as shown in FIG. 2, for example, will have a range that is a percentage of the full 10V range corresponding to the percentage of total area represented by that slave card 201 and other cards (not shown) cascaded into it. Thus, a CPU board 201 whose sensor array 205 full scale output represents 50% of the full opening of the fume hood, with no other CPU boards cascaded into it, would have a voltage output of no more than 5V. The total sash position output is thus readily produced by summing the outputs of each cascaded CPU board 201 and 203 in a cascaded system.

An error condition will be assumed if the 0–10V input to any of various CPU boards 201, 203 in a chain exceeds 9.5V. Should this happen to a slave board 201, its sash position output signal (connecting to the 0–10V input of the master 203) will be brought to >10V. This will cause the master CPU board 203 to output >10V on the sash position signal line 207 connected to the fume hood controller (not shown). Also, the command line 209 will be pulled to >10.5V.

If the number of Hall switches (FIG. 5A, 501) detected while sensing sash position exceeds the maximum number deduced during calibration, described below in connection with the application of the invention illustrated in FIG. 6, the sash sensor will maintain its output at its last value for up to a second during persistence of the condition. Should the condition persist longer, the command line will be raised to >10.5V and the sash position signal will be brought to >10V for as long as the condition persists. A similar response occurs if the CPU board (FIG. 1, 103; or FIG. 2, 201, 203) no longer detects the sensor array (FIG. 1, 101; FIG. 2, 205, 211).

Figure 3:
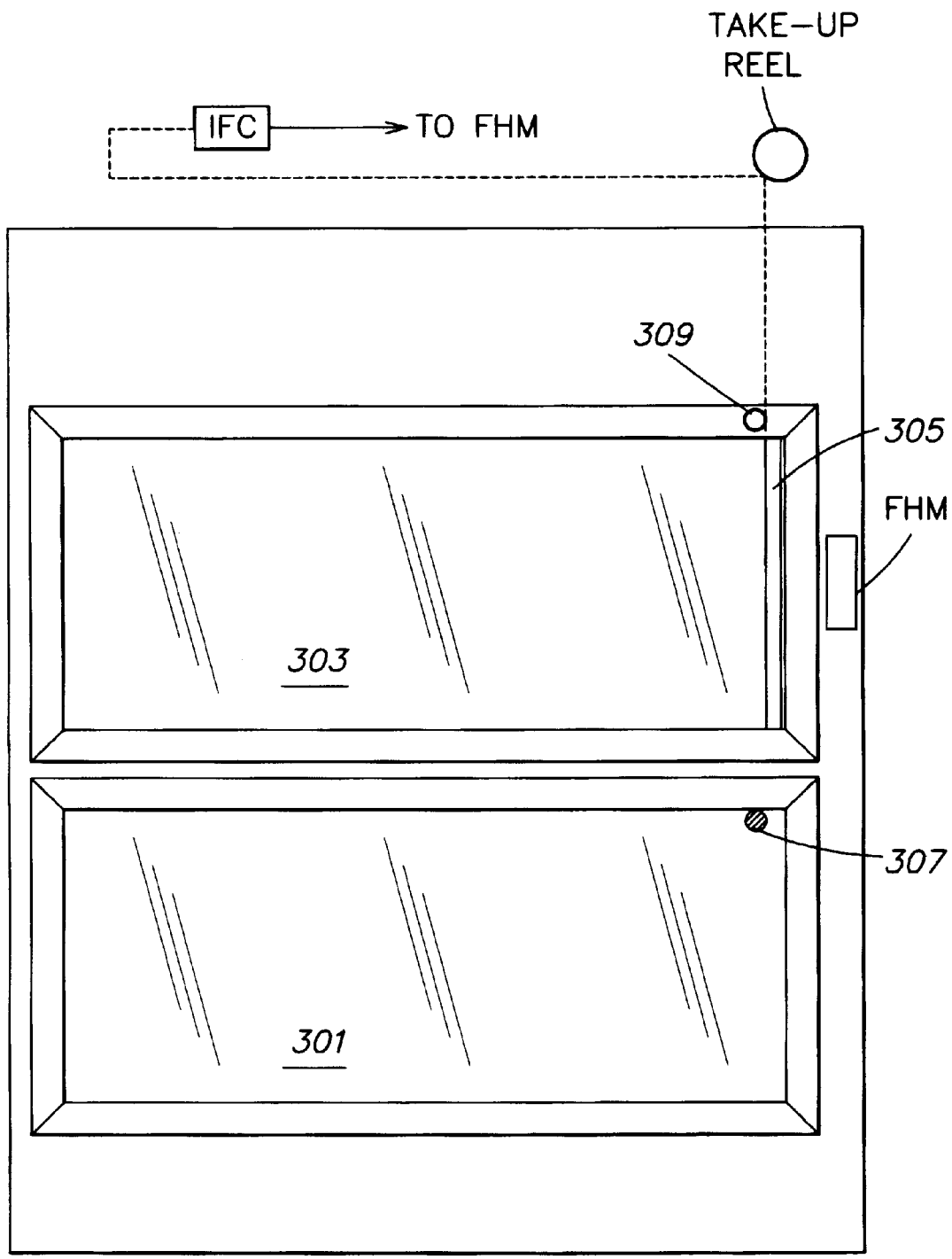
FIG. 3 is a front view of an embodiment of the invention installed on a walk-in fume hood.

Next, an application of this embodiment to a walk-in hood with two vertically moving sashes and no horizontal sashes is described in connection with FIG. 3. Here, the vertical movement of both sashes 301, 303 is detected using one Hall sensor array 305 and two point magnets 307, 309. The top point magnet 309 is used to detect the vertical position of the top sash 303, while the point magnet 307 attached to the bottom sash 301 is used to detect the position of the bottom sash 301 with respect to that of the top sash 303.

A catch (not shown) attached to the lower sash 301 prevents the lower sash from passing above the top sash 303.

Figure 23A:
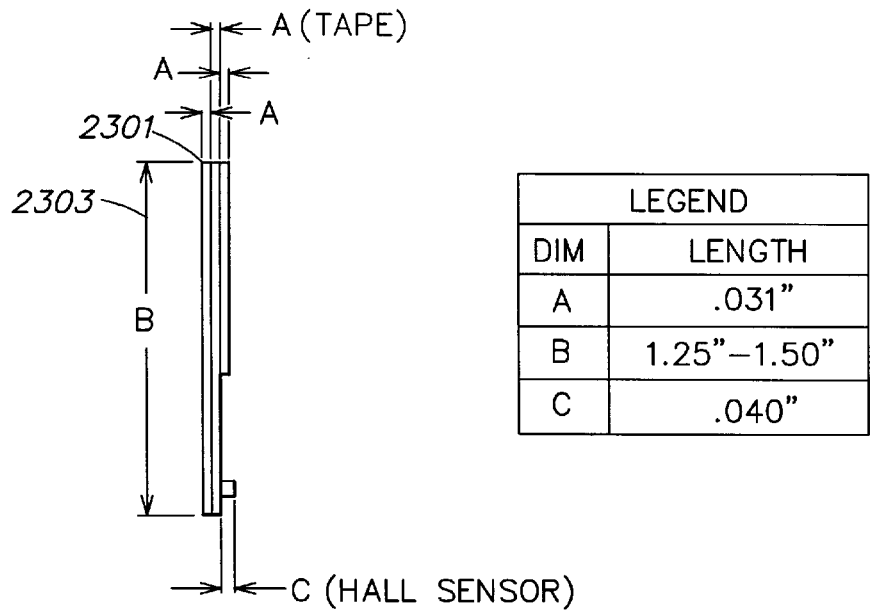
FIG. 23A and FIG. 23B are plan views of a sensor element as shown schematically in FIG. 21.
Figure 23B:
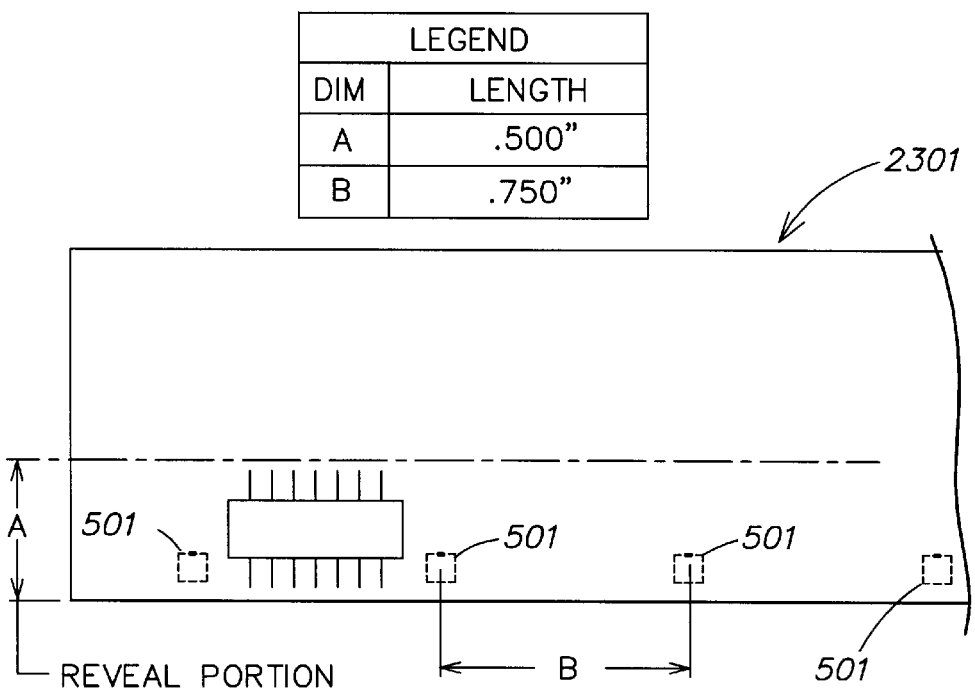

A schematic of an exemplary sensor array 101 is shown in FIGS. 5A and 5B. A corresponding plan view of a sensor array (FIG. 1, 101) is shown in FIGS. 23A and 23B. This represents the circuitry for one 6-inch segment of a sensor array 101 with sensors 501 placed at 0.75" intervals. It is envisioned that several standard array sizes (each composed of several 6-inch segments) will be available for application. However, sensor elements may be distributed at other intervals on circuit boards of other sizes to realize other resolutions and lengths.

Each circuit assembly is simply an arrangement of eight Hall sensors 501, mounted on a PC board FIGS. 23A and 23B, 2031), each Hall sensor 501 being sequenced by the output of an 8-bit serial-input/parallel-output shift register 503. The circuit arrangement is designed so that a sensor of any practical length can be made by way of the simple interconnection of multiple PCB segments. The entire assembly is designed to operate off of +5V and is sequenced via a six-wire interface 505 to the CPU board, e.g., FIG. 1, 101. Other power supply arrangements and circuit interfaces can be used without violating the spirit of the invention. The entire assembly may be covered by a protective cover (FIG. 23A, 2303).

Figure 20:
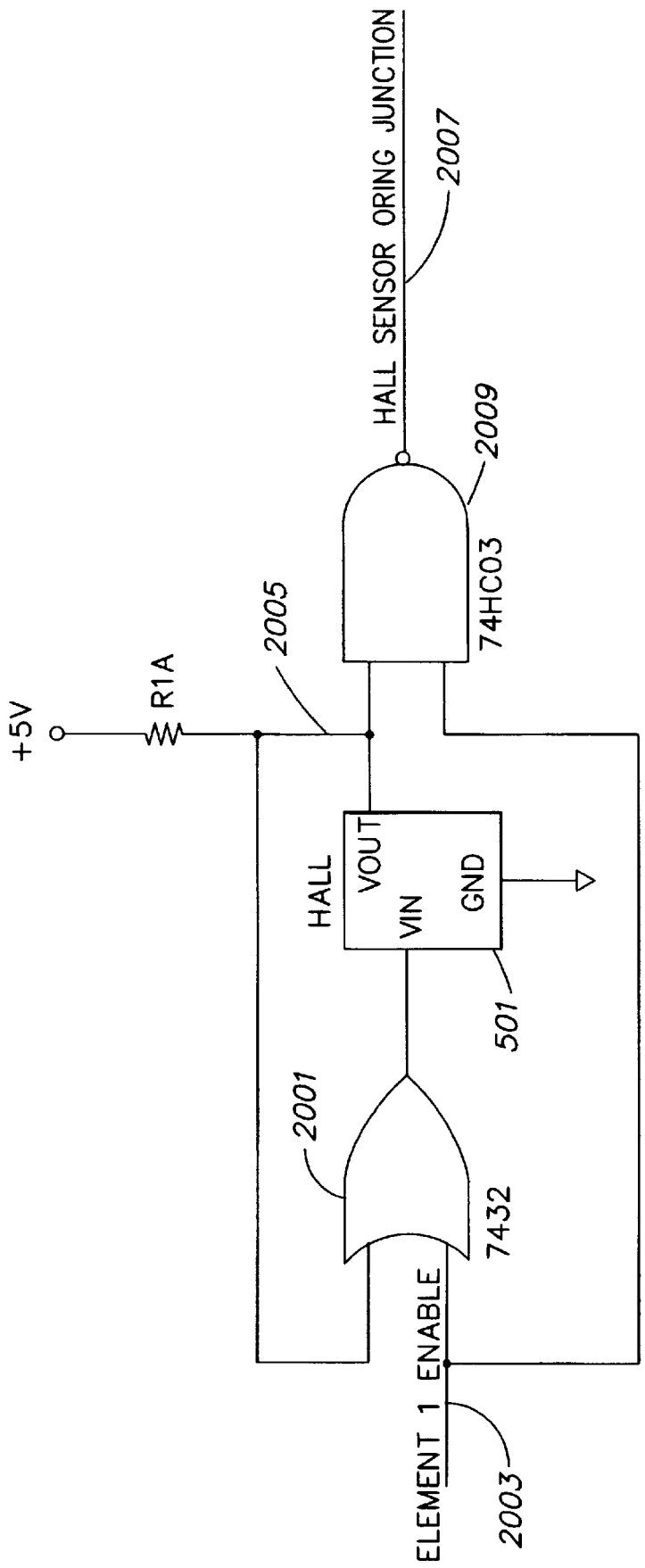
FIG. 20 is a schematic drawing of a circuit detail useable in the system of FIG. 5.

In order to increase the stability of the sensor output, power to the Hall sensors 501 can be latched, as shown in FIG. 20. A Hall sensor 501 receives an input signal through OR gate 2001 when either the enable signal 2003 is asserted or the Hall sensor 501 has asserted an output signal 2005. The Hall sensor 501 output signal 2005 is transferred to ORing junction 2007 through NAND gate 2009 only when the enable signal 2003 is asserted.

Figure 21B:
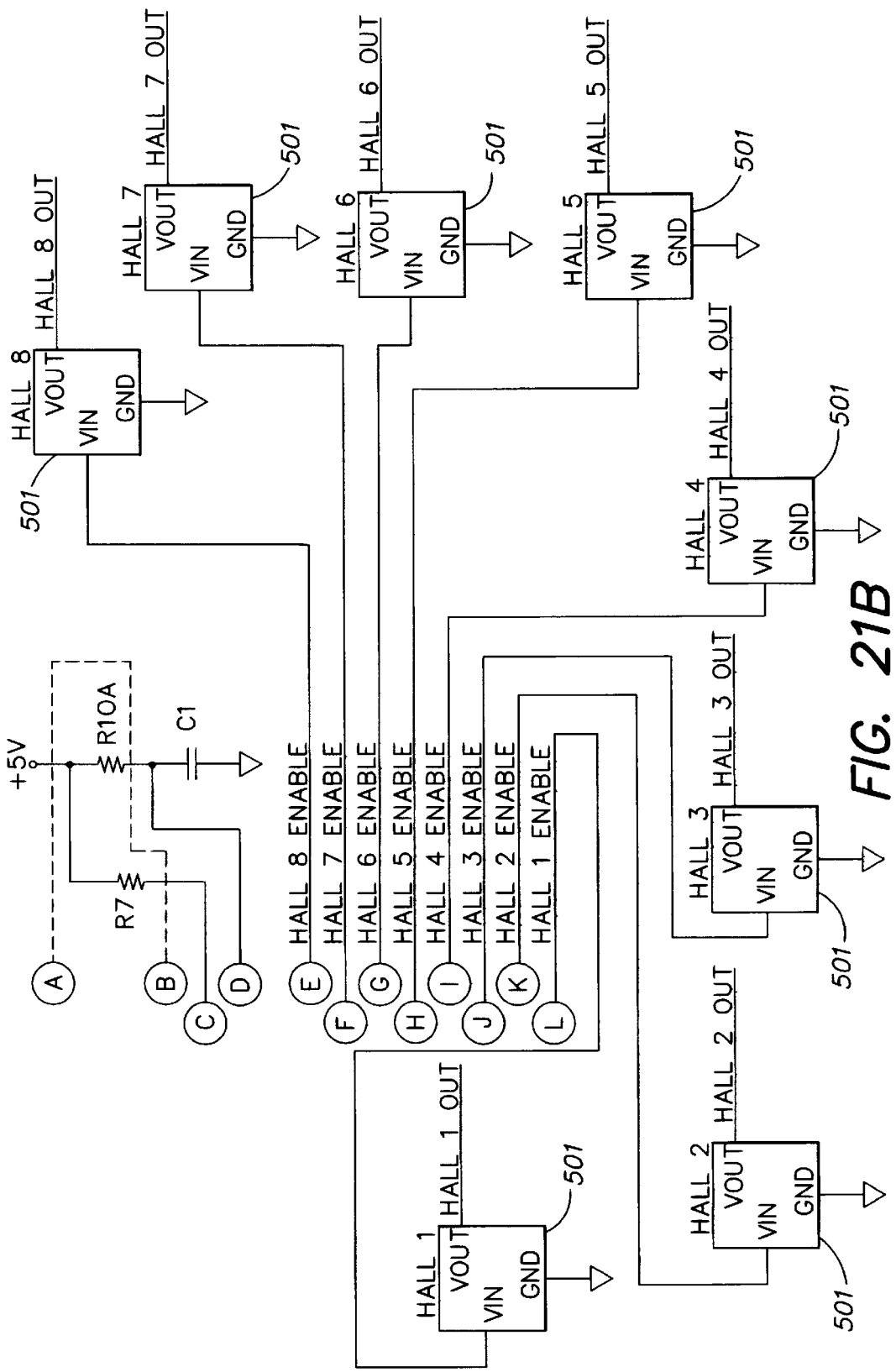

An alternative circuit to those of FIGS. 5A, 5B and 20, yet providing the same functionality is shown in FIGS. 21A and 21B. The Hall elements are enabled and their outputs detected using a low-cost 8-bit micro-controller. For example, the PIC16C55, available from Microchip Technology Inc., may be used in view of low cost, on-chip ROM, low power consumption and packaging features which make it attractive for a low-profile sensor assembly. In Microchip's Plastic Shrink Small Outline package, the PIC16C55 has a thickness of about 0.073".

The processor 2101 supports all eight Hall sensors 501, as well as performing the latching function of the circuit of FIG. 20. Finally, the processor 2101 carries out the function of the shift register (FIG. 5B, 503) discussed earlier.

Figure 4:
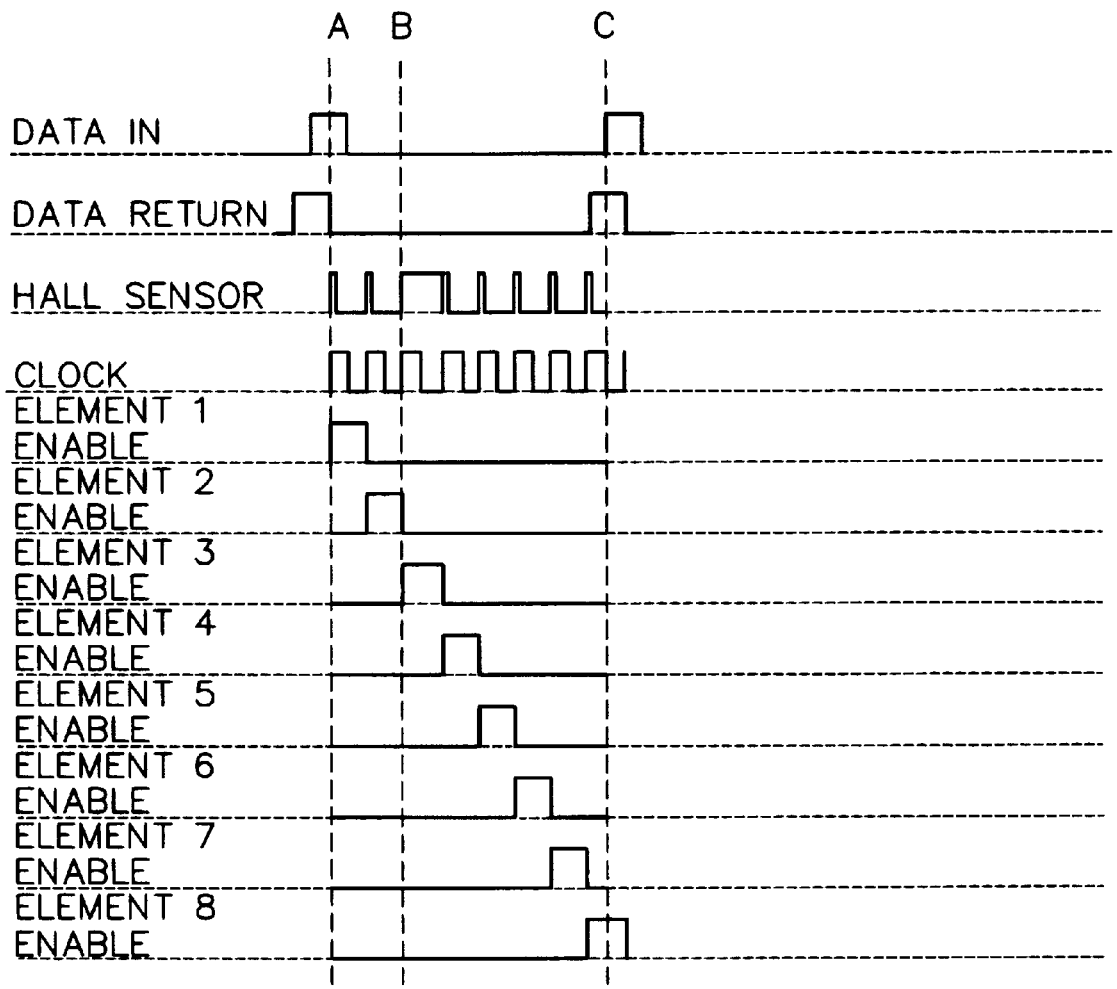
FIG. 4 is a timing diagram illustrating time multiplexing sensors according to one aspect of the invention.

Reference is now made to FIG. 4, which illustrates the relative timing for the various signals connecting to the CPU board. FIG. 4 is a simplified view of a multiplexing cycle for a sensor array having only eight elements. As noted above, much larger numbers of elements are practical. Time "A" represents the beginning of one cycle. In this illustration, the Data Return is shown to be asserted up to the point of the leading edge of the clock at time "A". This is the result of data shifting out of the last latch location at the end of the array, i.e., element 8 enable (FIG. 5B, 507) being asserted following the last positive-going clock (FIG. 5B, 509) transition. The diode D7 (FIG. 5B) is inserted on the board serving as the last segment of the sensor array. The Data Strobe Return serves as feedback to the CPU Board (e.g., FIG. 1, 101), which prompts the assertion of Data In line. Clocking the shift register (FIG. 5B, 503) when Data In is asserted commences the cycle anew. At boot-up, the CPU board 103 automatically feeds a bit into the Data-in Line in order to prime the operation.

As a data bit is clocked through the shift register (FIG. 5B, 503), its outputs are activated as shown in FIG. 4, turning individual Hall sensors on at unique points in time. This of course is the essence of the multiplexing function, whereby each sensor's output, or state, is sampled at discrete points in time in order to surmise the position of point magnets which have been attached to the various horizontal sash panes.

Note that, for each rising clock edge, an initial response is realized for each Hall sensor. This is a result of the finite settling time for these devices, which is typically on the order of 20–30 microseconds after power is applied. Each sensor is simply activated by applying the shift register outputs to the power pin of each of the dedicated sensors.

At time B, Hall sensor Element 3 is exposed to a magnetic field. The Hall sensors 501 used in this multiplexing technique each have open collector or open-drain outputs, thus permitting their common connection.

The sensor array is sized and the point magnet positions selected so that the positions of the point magnets of all sashes are detected at all times. That is, the preferred method of sensing opening measures sash displacement directly, rather than relying on an indirect measurement of displacement computed after directly measuring sash overlap. This simplifies the CPU firmware significantly.

Figure 6A:
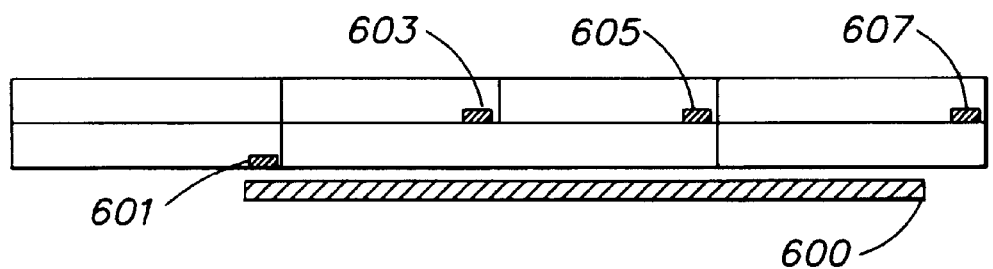
FIG. 6A is a top view of the embodiment of FIG. 6.
Figure 6:
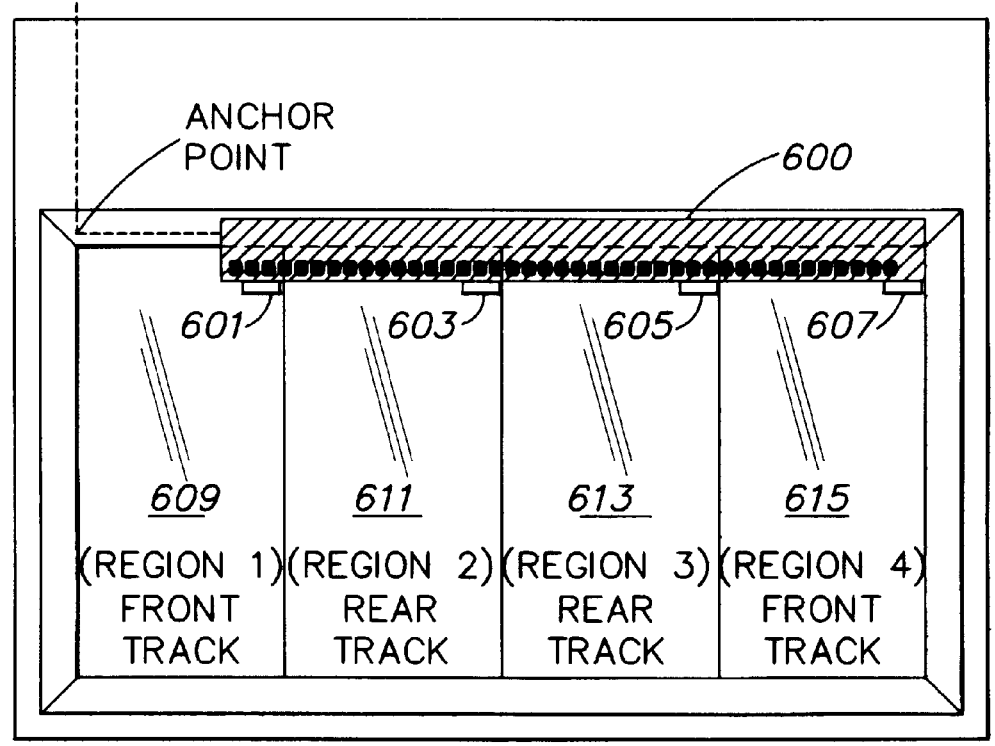
FIG. 6 is a front view of an embodiment of the invention installed on a fume hood.

FIG. 6 illustrates the application of the sensor array 600 to horizontal sashes. A point magnet 601, 603, 605, 607 is placed on each of the horizontal panes 609, 611, 613, 615. At the time of calibration, the CPU board determines the useable portion of the array 600 by observing the left-most point at which a magnet 601, 603, 605, 607 is detected, with the sashes 609, 611, 613, 615 in the fully closed position. Also determined at calibration, is the standard width of the sashes 609, 611, 613, 615. Calibration is now described in greater detail.

The calibration process includes two major steps of concern with respect to this invention: calibration for ratiometric functionality and calibrating the scaled output. To minimize the amount of intervention required to perform periodic adjustment, the user will be able to specify which of the steps or scaling functions is to be performed. Once the CPU is placed into calibration mode, this is accomplished using any suitable command input.

Calibration sequencing is initiated by any suitable means for commanding such initiation in a fume hood monitor to which a sash position sensor is connected. The command connection 105 provides bidirectional operation between the CPU board 103, the monitor 107 and the valve controller 109. Under normal operation, i.e., after calibration, the CPU board 103 provides the valve controller 109 its setpoint directly over the command line 105. In this exemplary embodiment, the user of the fume hood can initiate calibration by inserting a jumper on CPU board 103.

During calibration, the CPU board 103 is sequenced through the various calibration steps using a suitable command input, in the exemplary embodiment. In turn, following each prompt from the monitor 107, at each calibration step, the CPU board 103 pulses the command line a number of times correlating to the calibration step. This will cause an LED to flash at the monitor, to give a technician visual feedback of the status of calibration. Other status and input devices and methods, such as keypads, displays and more elaborate computer-based interfaces are possible.

First the CPU board 103 is placed in calibration mode as explained above. During the next step, the vertical and horizontal minimum positions are recorded. A technician performing calibration first closes the vertical and horizontal panes and then gives a command to the CPU board 103, for example by depressing the override button, which causes the CPU board 103 to record the sash position output produced with the panes in their most closed positions. Next, the horizontal pane size is indicated to the CPU board 103. The technician closes the vertical sash and arranges the horizontal panes so that the distance between the point magnets affixed to two of the panes is equal to the width of the horizontal panes, while all other horizontal panes are moved to one extreme position. Again the sash sensor output is recorded by the CPU board 103 in response to a command such as depressing the override button. In the next step, the vertical and horizontal pane maximum opening is measured. The horizontal panes are positioned in their most open position. The vertical sash is raised to its most open position. The override button or other command input is provided to record the sash sensor output in this position. Finally, the ratio of horizontal to vertical opening of the combination sash is recorded. The vertical sash is positioned so that its opening is equal to the maximum opening possible using only the horizontal panes. This position is then recorded by the CPU board 103, as above. After performing these steps, the sash position sensor has been calibrated for the proper positioning and spacing of the magnets and sensor elements.

The next group of steps performed establish the scaling of the sash sensor output voltage and the command signal. Scaling of the sash sensor output voltage is useful for two reasons. The first is to limit the sash position sensor output signal to a value less than 10 volts, so as not to output a sash position signal which may be interpreted as an error condition, when no error exists. The second is to scale the sash position sensor range properly when the CPU board is used as a slave. For example, if the range of area sensed by a slave CPU is 50 per cent of the maximum total fume hood opening, then the maximum sash position sensor output signal value for the slave CPU board should be one-half of full scale or about 5 volts. In order to establish the maximum sash position sensor output voltage, the sashes are positioned to produce the desired maximum output voltage, and the CPU is commanded to store the resulting voltage as the maximum sash position sensor output. By similarly positioning the sashes to produce certain desired command signal outputs, the scale of the command signal can also be set.

Since the sash position sensor is an integral part of a fume hood control system, in which many components and functions interrelate, there may also be other calibration procedures used in any particular installation. However, the additional calibration procedures used or required by any particular installation can be selected by the skilled artisan.

Operation of the sensor array is now described in greater detail.

An objective of scanning the sensor array 600 is to deduce the actual locations along the length of the sensor array at which a point magnet is sensed. This information is stored in a location of the CPU's RAM referred to hereinafter as a RAM Stack. The location may be a stack, register or other suitable memory and data structure. In this embodiment, the data that is stored includes the location along the sensor array 600 at which each of the various magnets 601, 603, 605, 607 is detected. For example, in FIG. 6, four point magnet data entries to RAM Stack would be realized, owing to the four point magnets 601, 603, 605, 607 exposed to the sensor array 600. The location data identifies the sensor element that detects a given magnet so that, if a sensor element "4" senses a magnet, the data stored in RAM Stack for that condition is "4" (or 04H). The only other entry into the RAM Stack is an end-of-array marker, which is used to both signify the end point of the sensor array data to be read by other routines, and to differentiate data collected using one array from that collected using another. In an application such as that depicted by FIG. 7, wherein a second sensor array is multiplexed in conjunction with a first sensor array, data from the first sensor array is separated in memory from data from the second sensor array, as described above.

The scanning sequence is now described with reference to FIG. 32.

At the beginning of the sensor scanning routine, a variable referred to, for convenience, as "Current Position" is initialized to zero. (Step 3201.) Current Position represents the absolute position (in relation to the sensor array) of the sensor element being queried. This data variable is incremented as the sensor elements are queried. Also, before scanning commences, a variable called "Data_in" is asserted High. (Step 3201). This is the same function as described in FIG. 4. Data_in represents the data bit to be shifted into the sensor array in order to discretely enable each sensor element. In FIG. 21A, this binary term is labeled as Data Strobe (In). The next step serves to clock the data bit into the sensor array. (Step 3203). This is accomplished by way of the clock in FIGS. 4, 21A and 21B. After the data is clocked, the CPU board samples the Hall sensor ORing line to determine the state of the presently enabled Hall sensor. (Step 3205). If the state is High, the current scan position is recorded in RAM Stack. (Step 3207).

Each time through the loop, depicted by the flow diagram, the routine checks to see if the present element being queried is at the end of the sensor array segment. (Step 3209). This is accomplished via sampling the Data Return line. If it is determined that the present element is not the last element in the array, the current position variable is incremented and the data in line is deasserted. (Step 3211). Following this, the next clock pulse is applied to start on the query of the next element. (Step 3203).

Once the last element in the array is detected, an end-of-segment marker is written to RAM Stack. (Step 3213). The next step is to determine if the present scan pertains to the first sensor array. (Step 3215). If it does not, the scan that was just completed is the second of the possible two, and the process concludes. If it does pertain to the first sensor array, the CPU calls configuration data in order to determine if a second sensor array exists. (Step 3217). If one does exist, the routine resets the current position counter and loops back to the beginning where data clocking resumes. (Steps 3219 and 3203).

Figure 32:
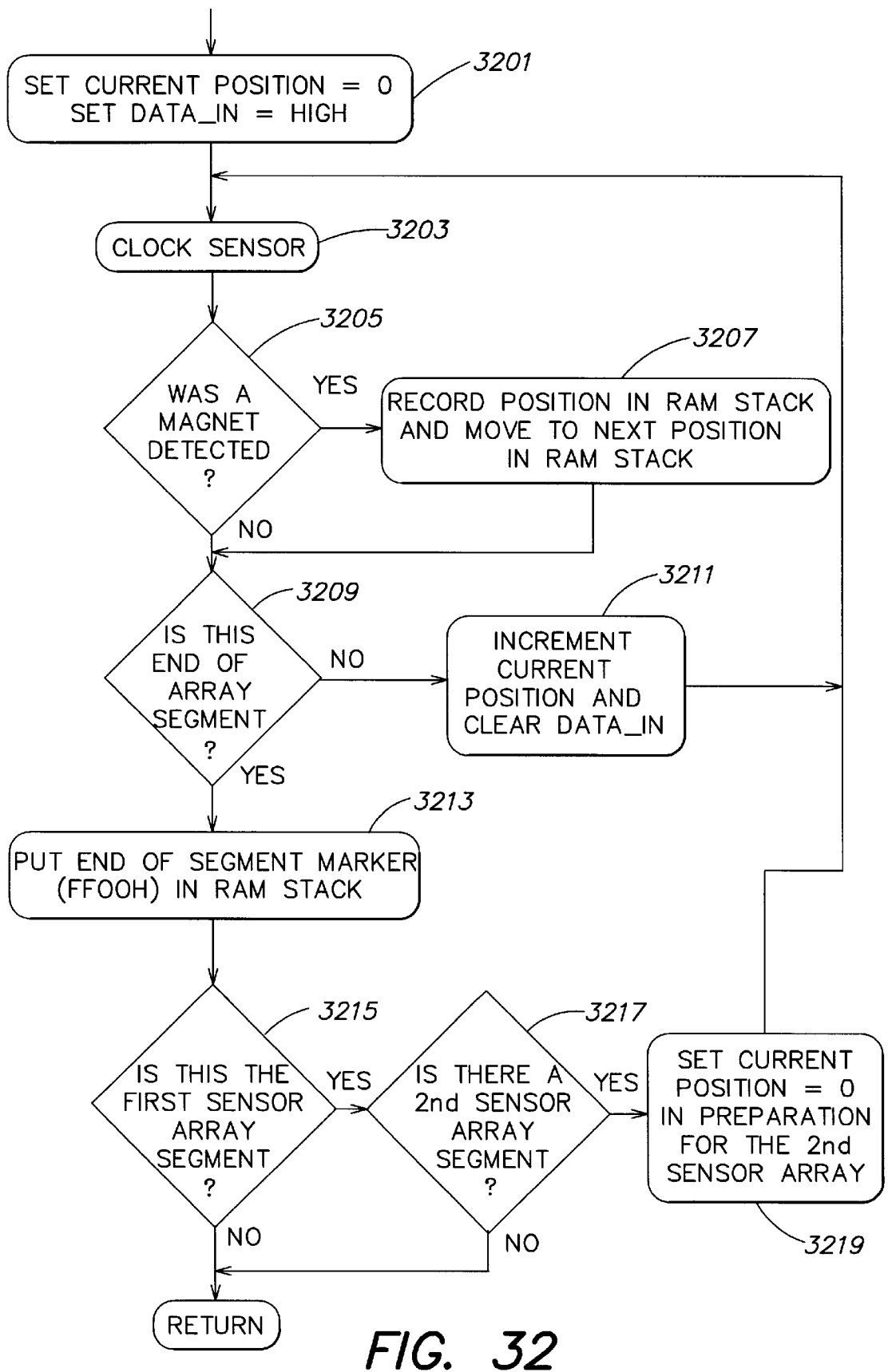
FIGS. 32–34 are flow charts of processes for performing the operations of embodiments of the invention.

Table 1 depicts the general results stored in RAM Stack after the completion of the scanning process of FIG. 32. This illustrates the data gathered from the horizontally mounted sensor array (Array 1) and the connected vertically mounted sensor array (Array 2) depicted on the top sash frame shown in FIG. 7.

TABLE 1

| Relative Position in Memory | Data | Comments |
| --- | --- | --- |
| 00H | # Correlating to position of first magnet detected | Magnets Detected by Array 1 |
| 01H | # Correlating to position of second magnet detected | |
| 02H | # Correlating to position of third magnet detected | |
| 03H | # Correlating to position of fourth magnet detected | |
| 04H | FFH | End of Segment Marker for Array 1 |
| 05H | 00H | |
| 06H | # Correlating to position where single magnet is detected | Magnet Detected by Array 2 |
| 07H | FFH | End of Segment Marker for Array 2 |
| 08H | 00H | |

Figure 33:
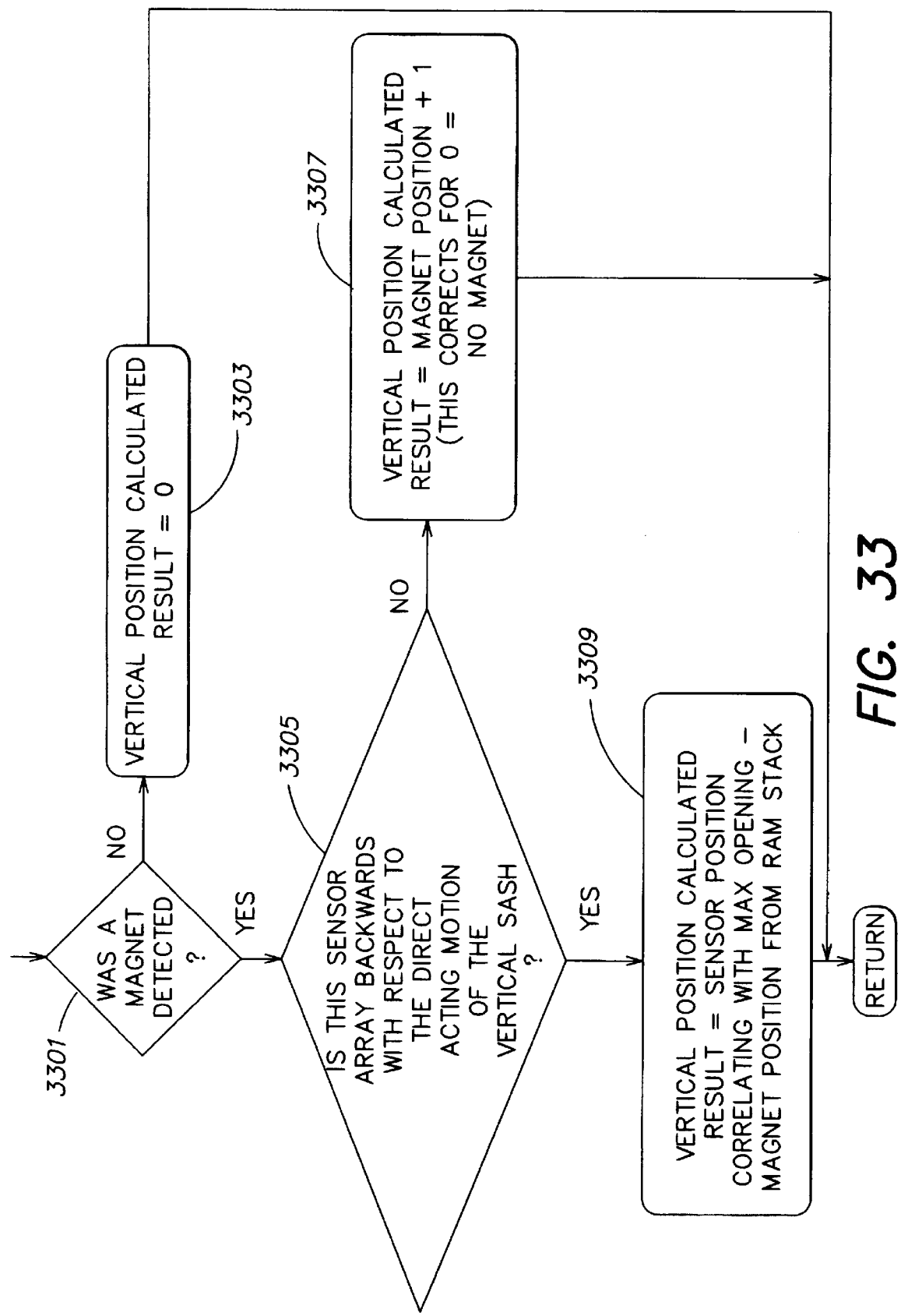

Computation of the vertical sash opening proceeds as illustrated in the flow diagram of FIG. 33. First, a determination is made as to whether a magnet was detected. (Step 3301). If not, then the vertical position calculated result is zero; that is, the vertical sash is fully closed. (Step 3303). Next, the sensor array may be attached to the sash in either of two physical orientations, a determination is made as to whether the sensor array is backwards with respect to the direct motion of the vertical sash. (Step 3305). This determination may be programmed into the CPU as a fixed parameter. If the sensor array is not backwards with respect to the direct motion of the sash, then the vertical position calculated result is reported as one unit greater than the magnet position, thus correcting for a magnet position of zero indicating no magnet. (Step 3307). Finally, if the sensor array is indeed mounted backwards with respect to the direct motion of the vertical sash, then the vertical position calculated result reported is the sensor position which correlates properly with the maximum opening minus the magnet position stored in the RAM Stack as shown in Table 1. (Step 3309).

Figure 34A:
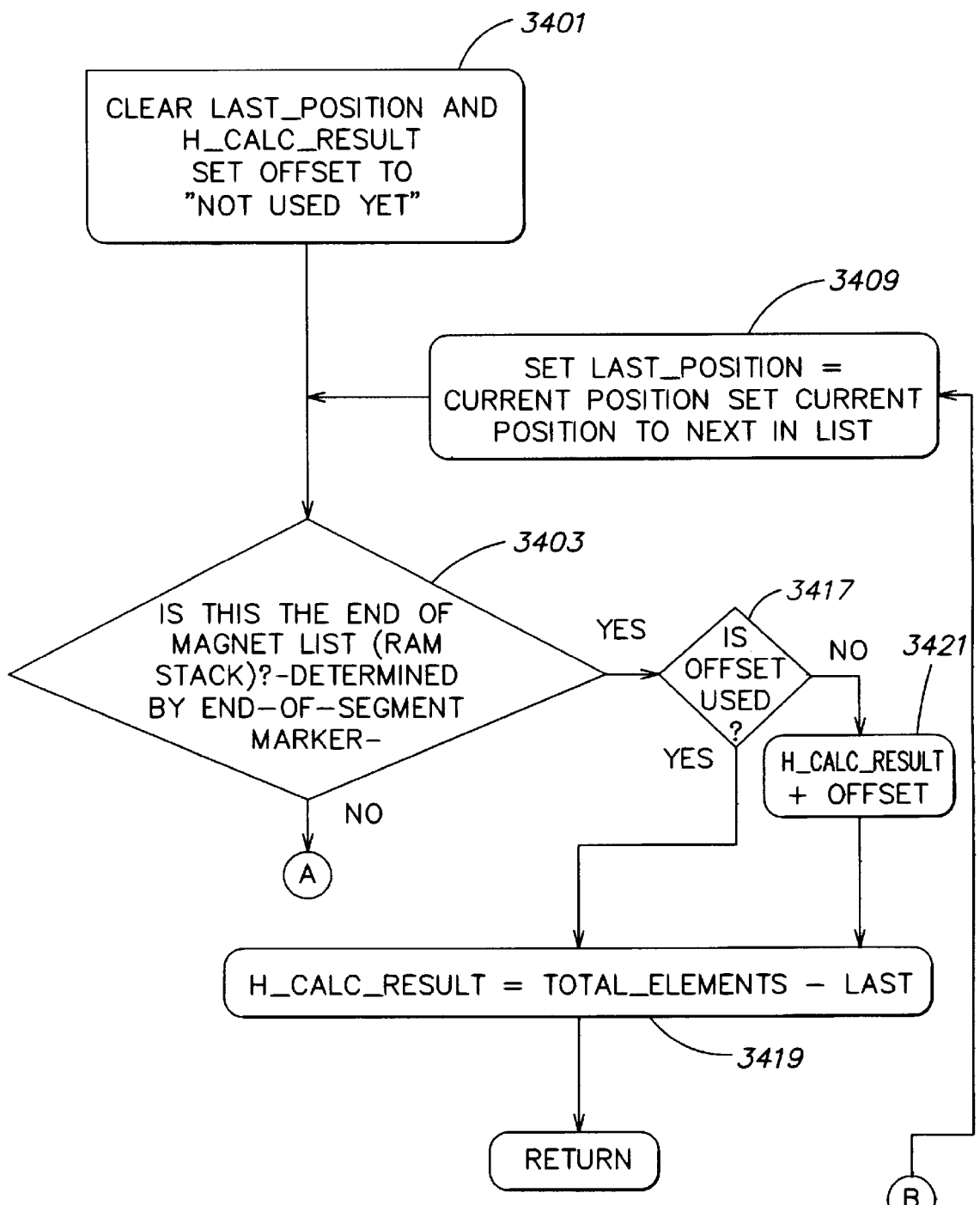
Figure 34B:
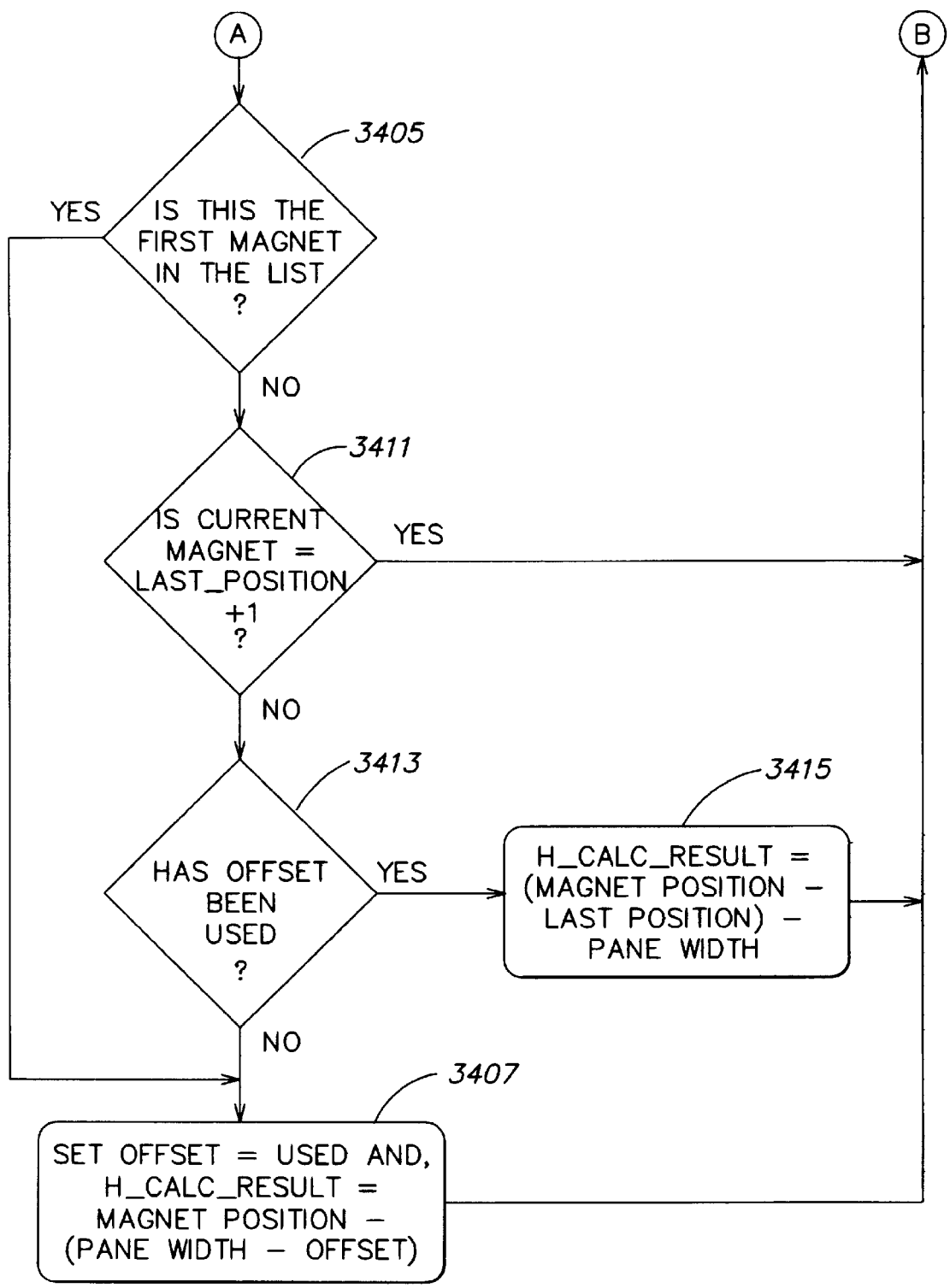

Finally, the horizontal sash opening is computed as indicated by the flow diagram of FIG. 34, whose terms are defined in Table 2 as follows.

TABLE 2

| | |
| --- | --- |
| Current Position | This is the position information taken from RAM Stack |
| Last_Position | This is the last position data retrieved from RAM Stack |
| H_calc_result | This is an absolute count of calculated horizontal sash opening. It is in units of sensor elements. H_Calc_result is a term that is accumulated as the opening associated with each magnet position stored in RAM Stack is processed. |
| Offset | The Offset terni accounts for the portion of the fume hood which is not covered by the horizontal sensor array. In FIG. 6, this is the portion of the hood starting from the upper left-hand corner of the sash frame, and ending at the left-hand most point of the sensor array. |
| Used Offset Flag | This flag is used by the routine to determine if the Offset has been added. |

TABLE 2-continued

| | |
| --- | --- |
| Total_Elements | Total number of sensors in the sensor array. |
| Pane Width | This is the absolute size of the sash panes in terms of the number of sensor elements one pane may cover. |

First, the Last_Position and H_calc_result are cleared. Also, the offset flag is set to not used yet. (Step 3401). Next, the procedure checks for an end of segment marker in the RAM Stack, at Step 3403. If the end of segment marker is not found, then the process continues with a determination of whether the process is processing the first magnet in the list. (Step 3405). If so, then the offset flag is set to used and the H_calc_result is set to the current magnet position minus the width of the sash pane minus the offset. (Step 3407). Completing the first loop through the process, the last position is set equal to the current position and the current position is set to the next position in the list held in the RAM Stack. (Step 3409). The query of Step 3403 is then repeated, followed by the query of Step 3405, provided neither the first nor the last magnet is currently being processed. The process then proceeds onto Step 3411, where a determination is made as to whether the current magnet is at one greater than the last_position. If so, then the process proceeds directly to Step 3409, as that indicates two horizontal sash panes which overlap. Otherwise, processing continues at Step 3413, where it is determined whether the offset flag is set to used. If so, then the H_calc_result is set to the magnet position minus the last position minus the pane width of the current pane, at Step 3415. Thus, the H_calc_result accumulates the total sash opening. Processing again continues with Step 3409, followed by Step 3403. Processing continues until an end of segment marker is found at Step 3403. Then, Step 3417 determines again whether the offset is set to used. If so, then the H_calc_result reported is the total elements minus the last element computed. (Step 3419). Otherwise, the H_calc_result is set to the previous H_calc_result plus the offset (Step 3421). Then the H_calc_result is set to the total elements minus the last at Step 3419.

Figure 22A:
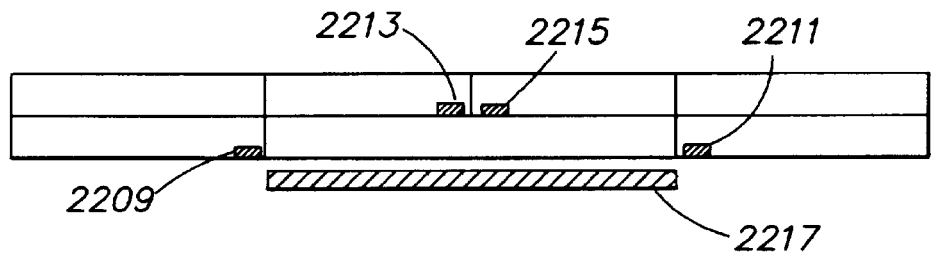
FIG. 22A is a top view of the installation of FIG. 22.
Figure 22:
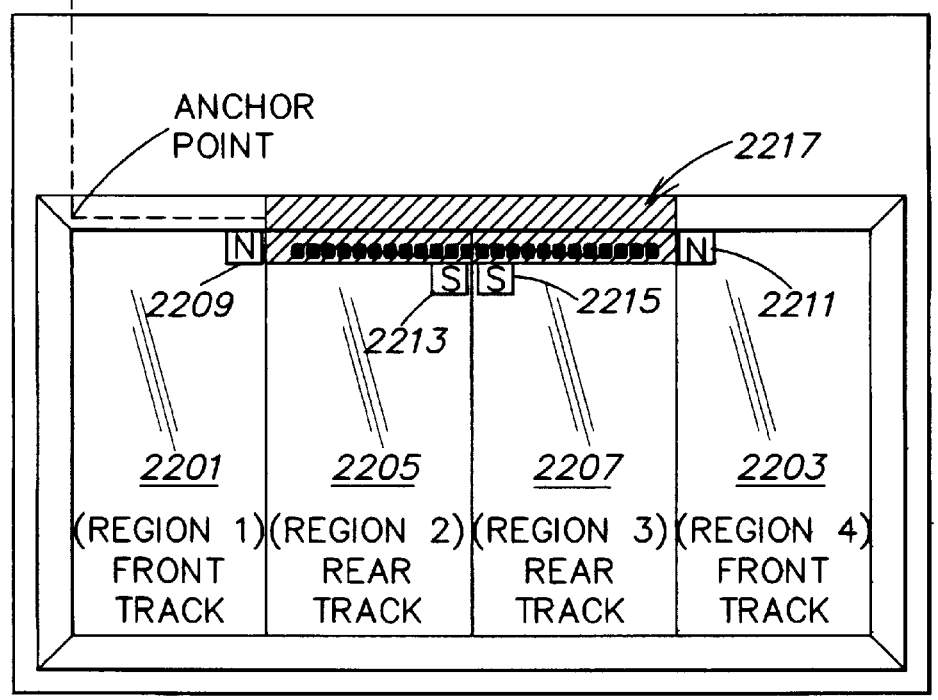
FIG. 22 is a front view of an alternative installation to that shown in FIG. 6.

FIG. 22 depicts an alternate application of the above-described sensor to a fume hood having horizontal sashes. The sashes residing in the front track 2201 and 2203 occupy regions 1 and 4 when closed. The sashes residing in the rear tract 2205 and 2207 occupy regions 2 and 3 when closed. The sashes 2201 and 2203 residing in the front tract are distinguished from those residing in the rear tract 2205 and 2207 by the arrangement of the magnets 2209, 2211, 2213 and 2215 applied to the sashes. Using this arrangement, a smaller sensor array 2217 can be used, compared to the sensor array used in the arrangement of FIG. 6. This reduces installed product cost and installation complexity, as well as mitigating product shipment problems resulting from sensor array packaging size.

As can be seen by inspection of FIG. 22, movement of sashes 2201 and 2203 is detected as the magnets 2209 and 2211 move across the sensor array spanning regions 2 and 3. Similarly, movement of sashes 2205 and 2207 are detected as magnets 2213 and 2215 also move across the sensor array spanning regions 2 and 3. In order to identify which sash pane 2201, 2203, 2205 or 2207 is indicated by each detected magnet, the point magnets are applied to the sash panes with the sashes residing in the front tract 2201 and 2203 having magnets of one orientation while the sashes residing in the rear tract 2205 and 2207 have magnets of a different orientation. For illustrative purposes, the front track sash panes 2201 and 2203 have point magnets 2209 and 2211 oriented with magnetic north faces towards the sensor array, while the rear track panes 2205 and 2207 have magnets 2213 and 2215 oriented so that their south pole faces the sensor array. Of course, the actual orientation of the magnets 2209, 2211, 2213 and 2215 is arbitrary, so long as the magnets attached to the front track panes 2201 and 2203 are distinguishable from those attached to the rear track panes 2205 and 2207.

In order to distinguish magnetic north from magnetic south, each sensor array element may include two Hall sensors, one being of a bipolar type. The bipolar sensor can be activated by both north and south oriented magnetic fields, while the other Hall sensor can be unipolar, that is sensitive to either a magnetic north or a magnetic south pole.

According to another method of distinguishing north and south facing magnetic poles, two unipolar Hall sensors are used in each sensor element. This technique requires that the two unipolar sensors be oriented in opposite directions from one another, so that the sensor element is capable of distinguishing magnetic north from magnetic south by which Hall element is activated.

Finally, rather than two Hall sensors in each sensor element position, as described above, one sensor capable of providing an output signal proportional to the strength of the measured magnetic field can be used. Such devices are readily available using Hall or magnetoresistive sensor technologies. The use of such sensor elements to provide the type of output specified above is well known in the art.

Figure 7:
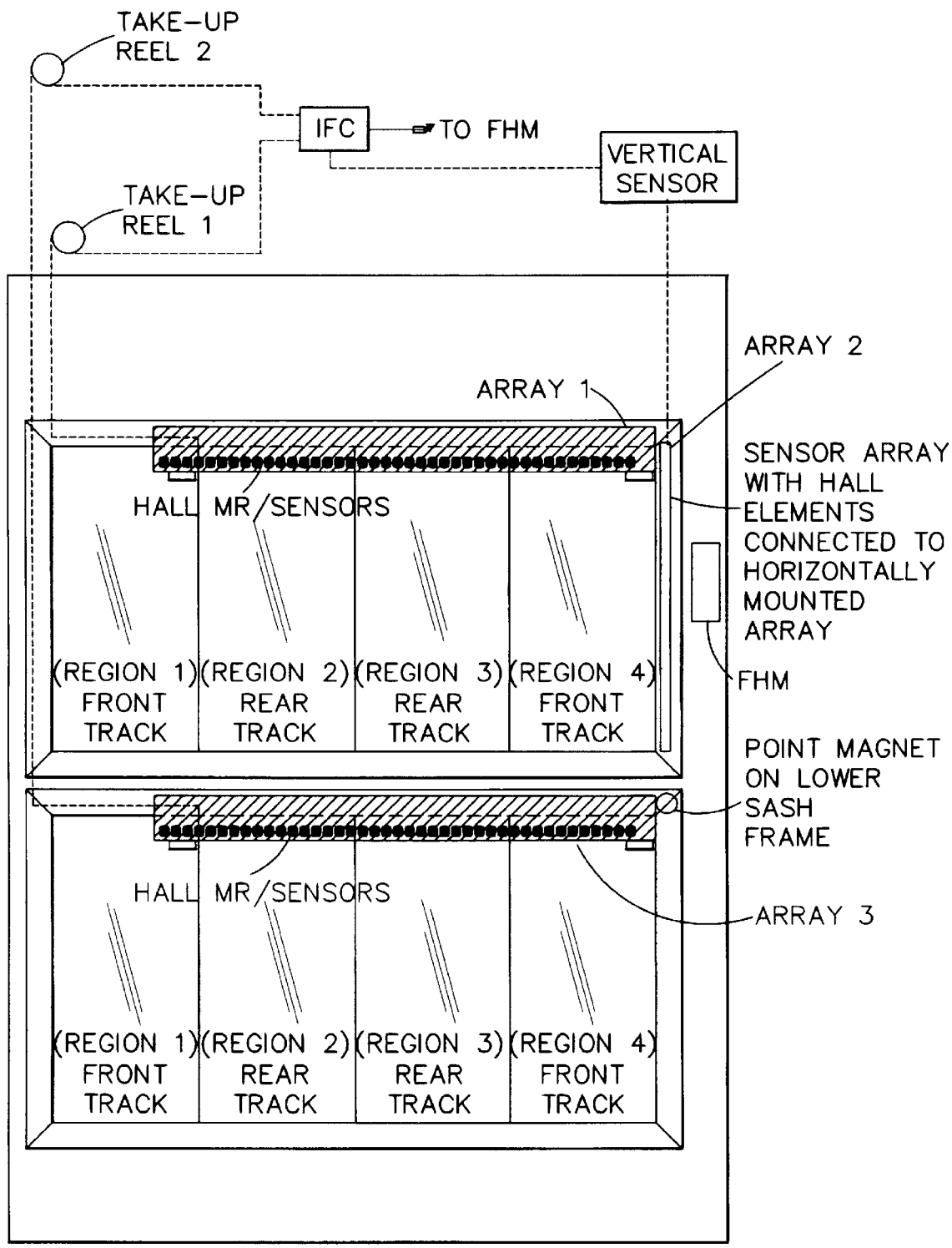
FIG. 7 is a front view of another embodiment of the invention installed on a fume hood.

FIG. 7 illustrates an application of the above-described sensor to a fume hood having two vertical sashes each containing four horizontal sashes. This system may use cascaded sensors, as described above.

Figure 24A:
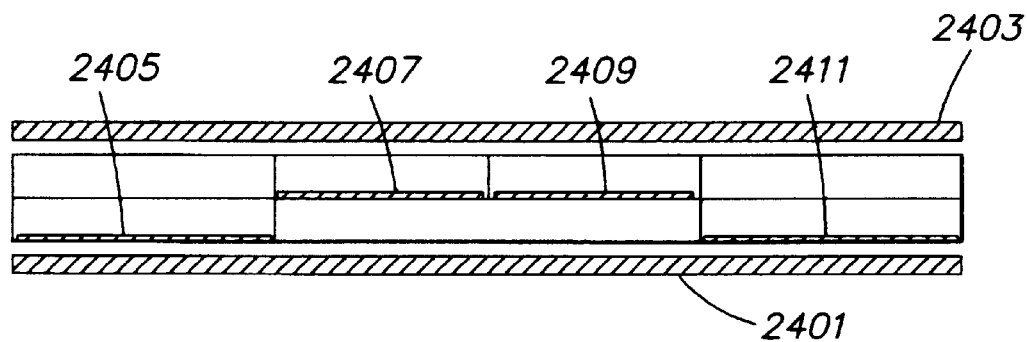
FIG. 24A is a top view of the embodiment of FIG. 24.
Figure 24:
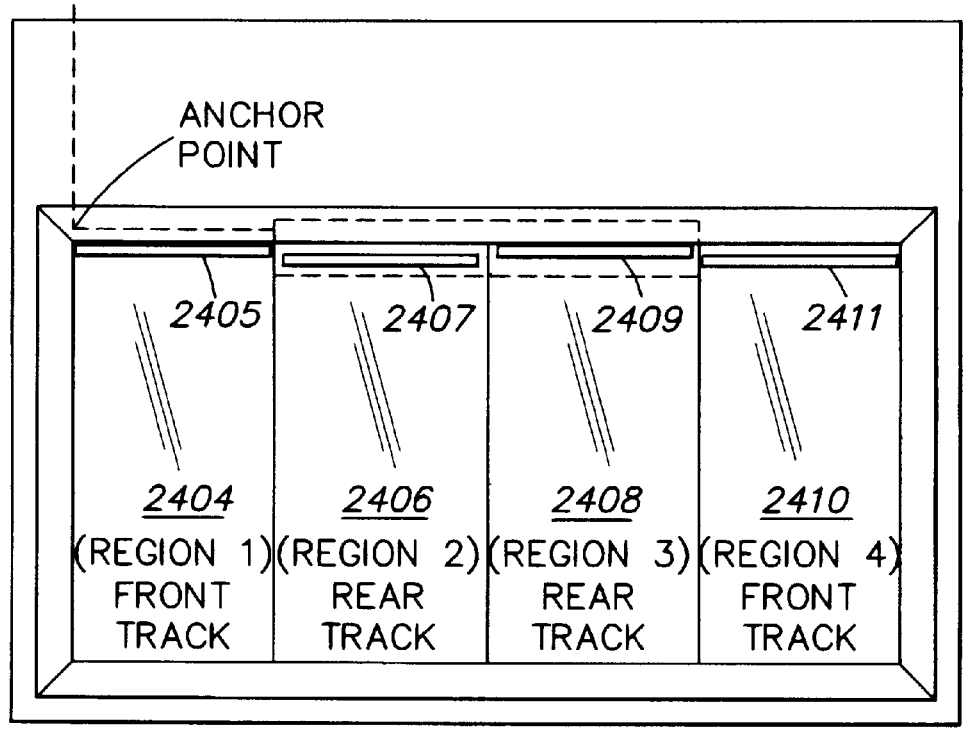
FIG. 24 is a front view of an embodiment of the invention installed on a horizontal sash hood.

FIG. 24 depicts an alternate embodiment of a multiplexed sensor array using coils as emitters of electromagnetic radiation, and either an array of coils or one large coil as a receiver 2403. This sensor arrangement incorporates a transmitter coil array and a receiver coil or array disposed in an opposing relationship to each other across a track of the sash pane. The two are positioned along the top edge of the sash frame, to protrude ¾" to 1" below the top of the opening of the combination sash frame. On each of the horizontal sash panes 2404, 2406, 2408, 2410 is placed a shielding element 2405, 2407, 2409, 2411 that is made to interfere with the transmission of electromagnetic energy between transmitter coil array and receiver coil or array in a predetermined fashion. The attenuation by the shielding elements of received energy is measured by the sensor system and sash opening is computed from the measured received energy.

The output of the receiver coil or array 2403 is a voltage that is proportional to the intensity of the time-varying electromagnetic field received. The physics behind the generation of such a received potential is well known to those who are familiar with the art. When a conductive coil is used in this way, it is often referred to as a search coil.

Figure 25:
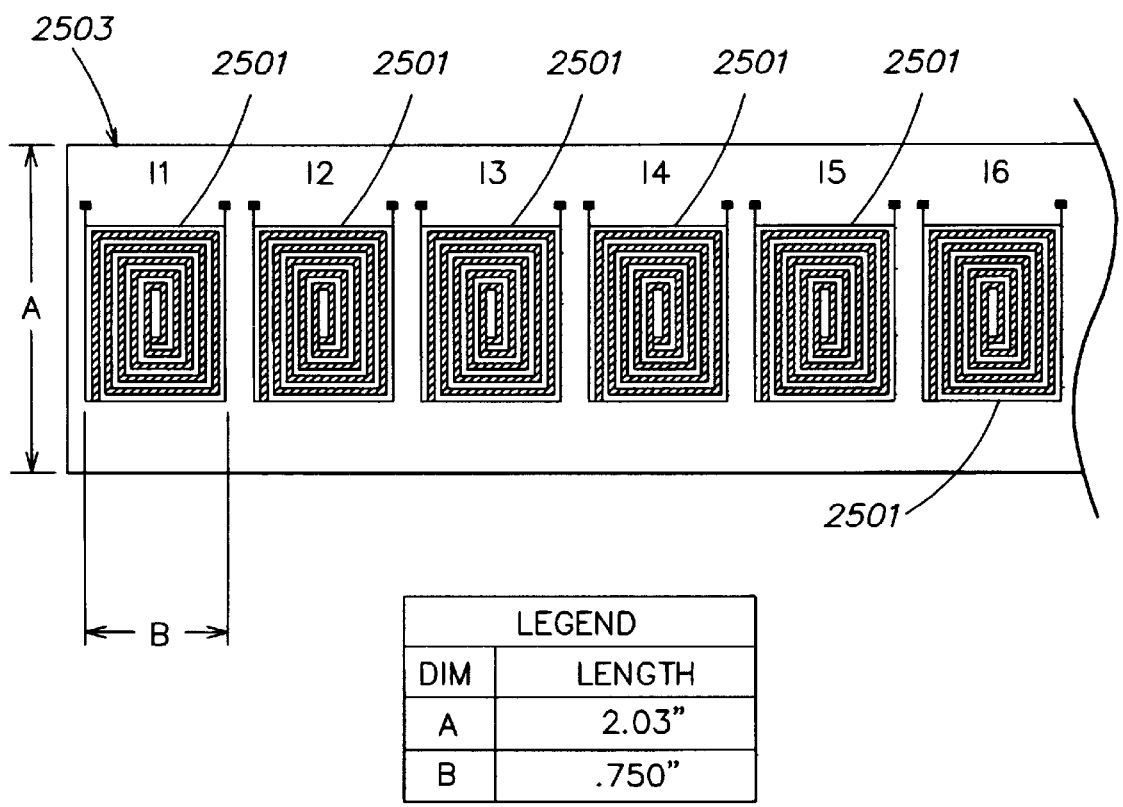
FIG. 25 is a plan view of a sensor array using search coils.

As shown in FIG. 25, the receiver 2403 and transmitter 2401 assemblies each include coil elements 2501, which are conductive traces in or on PCB material 2503 that is common to the industry. Each coil 2501 measures roughly ¾" in width and is positioned as shown to form an array.

Figure 26A:
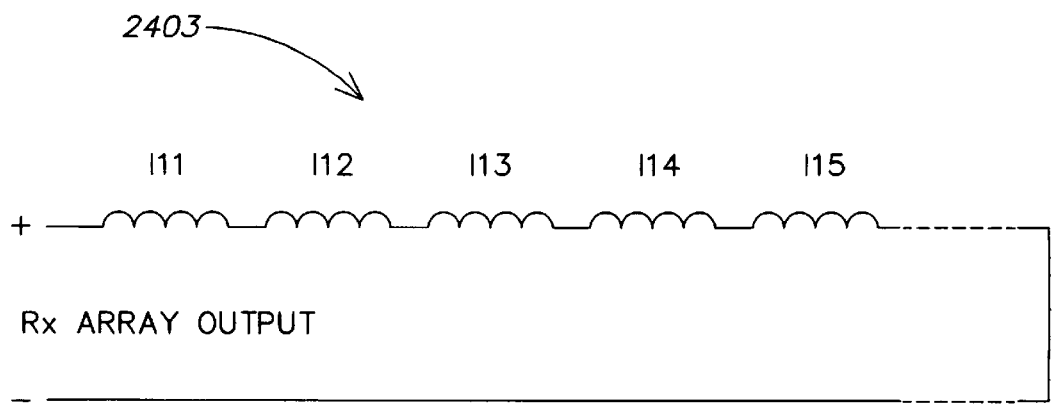
FIG. 26 is a schematic circuit diagram of a receiver array and a transmitter array.
Figure 26B:
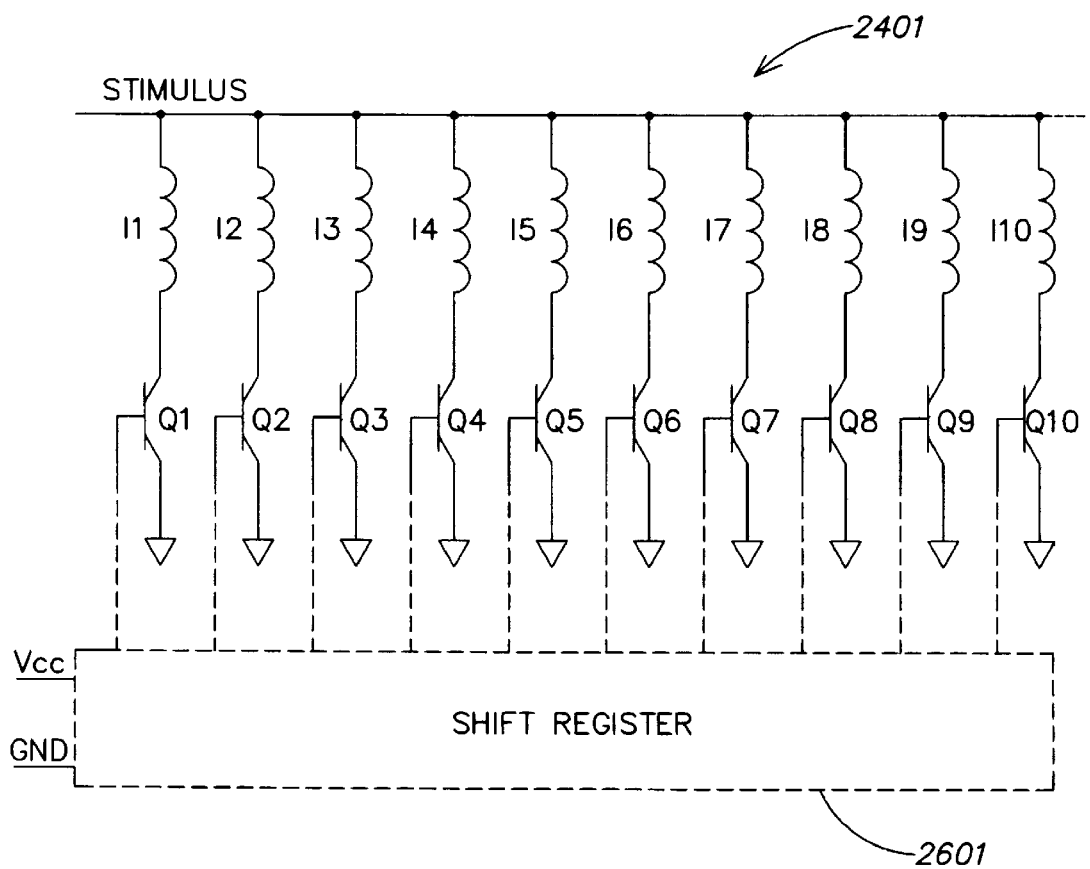

A simplified schematic view of the transmitter and receiver array is given in FIG. 26. As can be seen in FIG. 26, the coils I1–I10 in the transmitter array 2401 are discrete elements connected in parallel, while those I11–I5 in the receiver array 2403 are interconnected to form one common series element. It is this segmentation of coils in the transmitter array that results in a sensor, which can detect various conditions of sash overlap along its span. This is generally accomplished by way of the electrical stimulation of each coil at different points in time of a cycle over which the elements are sequenced. For convenience, in this embodiment, the individual transmission coils I1–I10 are sequenced in order of physical coil location along the length of the transmitter array. For example, considering the transmitter assembly of FIG. 25, the coils could be sequenced from left to right. However, the actual order of sequencing may vary, as long as it is consistent. This coil sequencing process is a form of multiplexing. In the illustrated embodiment, sequencing is achieved by turning on switching transistors Q1–Q10 corresponding to coils I1–I10, for example under control of a bit shifted through shift register 2601.

Figure 27:
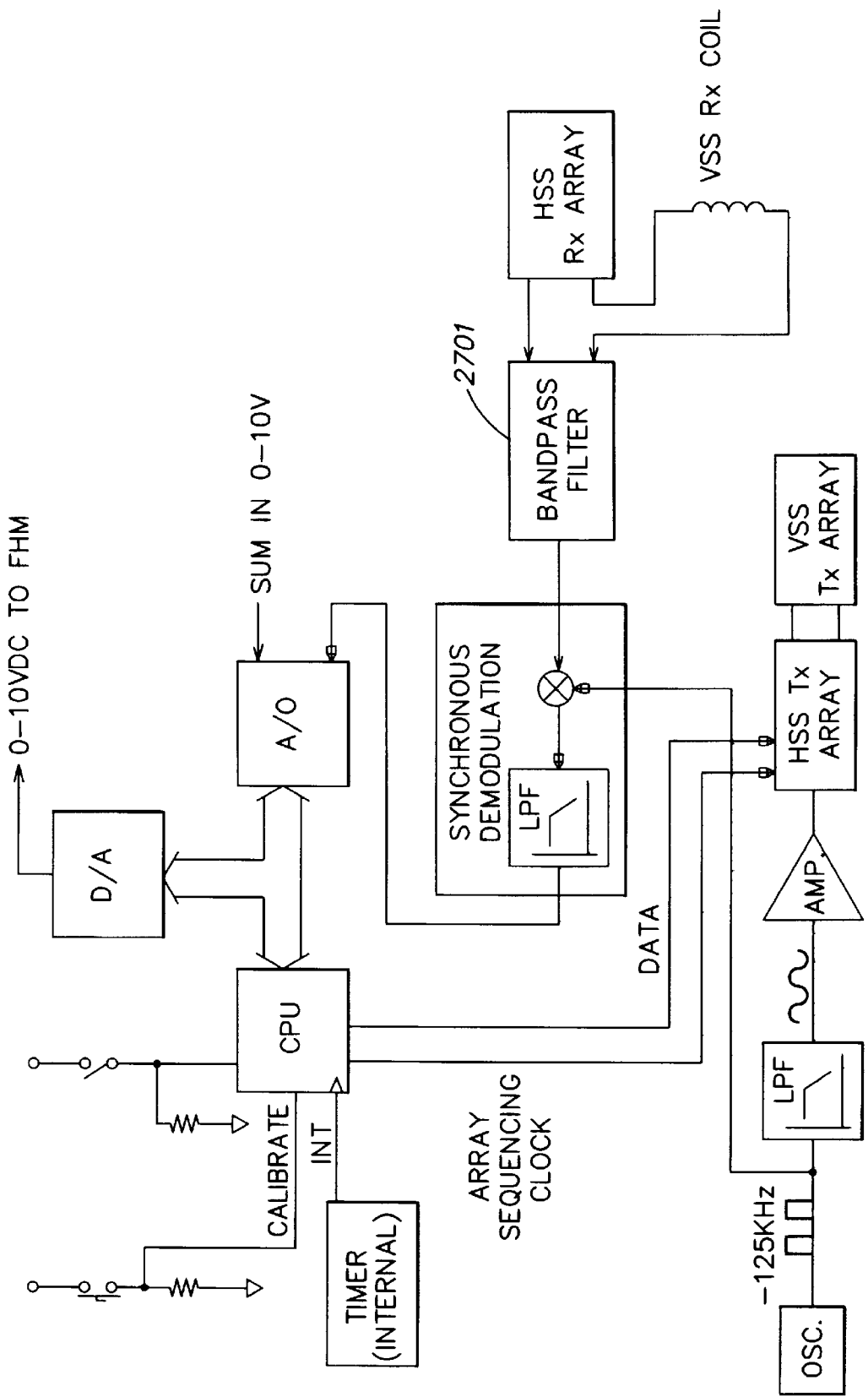
FIG. 27 is a functional block diagram of an embodiment of the invention using radio frequency search coil transmitter and receiver elements.

This embodiment employs three circuit assemblies, a transmitter array, a receiver array, and a signal processing card (SPC), as shown in FIG. 27, which illustrates the combined functionality of these components as a functional block diagram. The connections between each of the sensor components of this embodiment are shown in the block diagram of FIG. 28.

Figure 28:
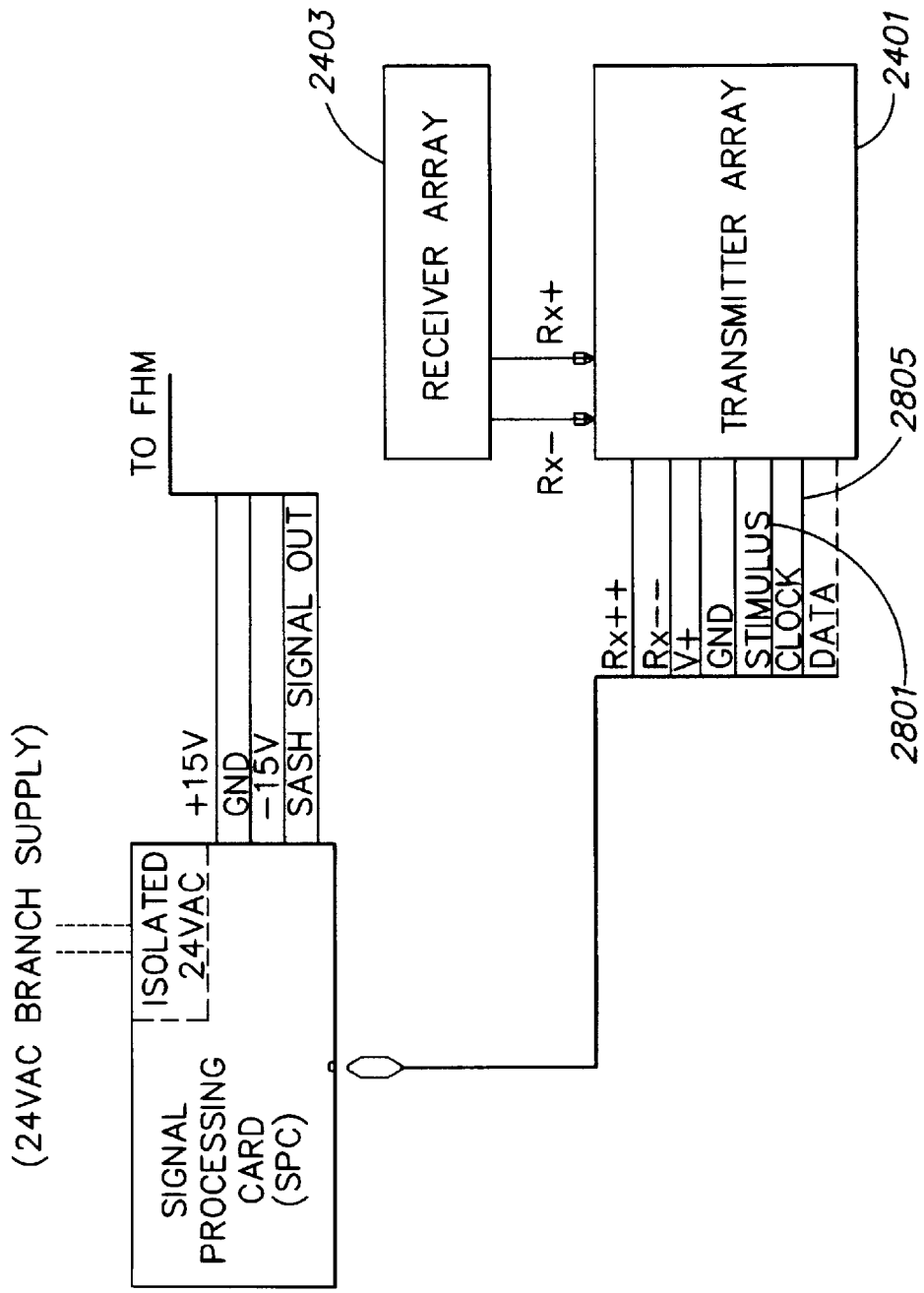
FIG. 28 is a connection block diagram of the system of FIG. 27.
Figure 29:
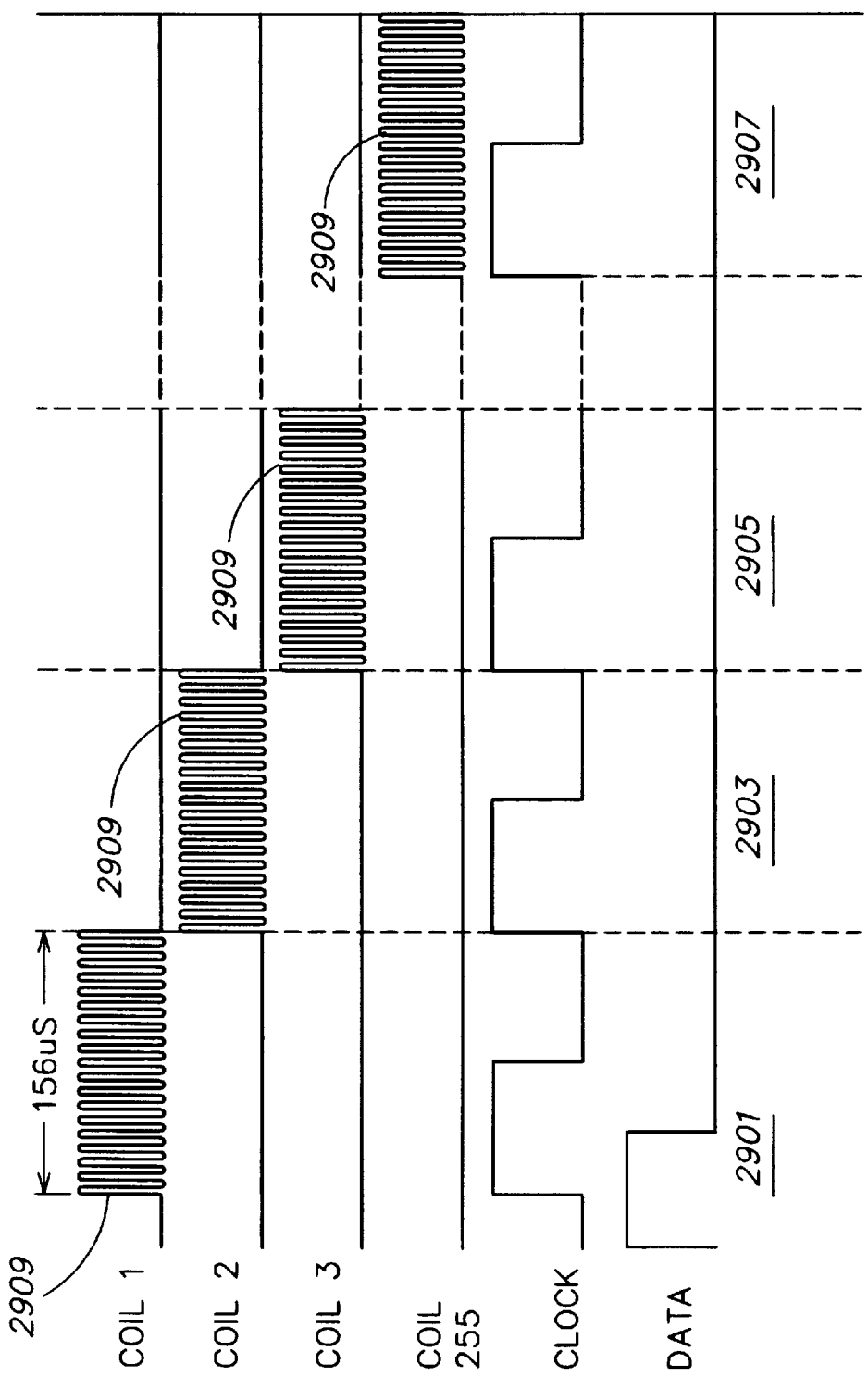
FIG. 29 is a timing diagram showing the timing of signals used in the system of FIGS. 26–28.

The embodiments of FIGS. 27 and 28 are now described in detail, along with the corresponding timing shown in FIG. 29.

The transmitter operates in such a way that it directs the time varying current established by the applied stimulus signal 2801 through each of the various coils in the array 2401 at unique points in time. See FIG. 29. The span of time during which a current path is established through a coil may be referred to as a time slot 2901, 2903, 2905, 2907. Each of the coil timeslots can be of the same duration, and each coil is assigned a unique time slot.

The transmitter sequencing logic is designed to handle 256 timeslots per sensor array. Given a response time of 50 milliseconds, at least 10 milliseconds will be reserved for the processing of low priority operations. Thus, 40 milliseconds would be the array-sequencing period, requiring the timeslots for each of the 256 possible elements to be approximately 156 microseconds in duration. Assuming these parameters are applied, the clock line (FIG. 28, 2805) will operate at 6.410 kHz. Given a stimulus operating at 125 kHz, there will be 19 cycles per time slot. The actual sampling of the received and demodulated signal may take a few tens of microseconds, depending on the complexity of the interrupt service routine. However, the mixed signal portion of this process can easily be accomplished in 8 to 10 microseconds using a low-cost 8-bit A/D converter. FIG. 29 illustrates the timing associated with the transmitter element sequencing.

The stimulus signal 2909 (also FIG. 28, 2801) is preferably a pure sinusoid in shape to minimize emissions. As is appropriate for the design of any deliberate transmitter of electromagnetic RF energy, these emissions should be tailored to specific limitations in power spectra. Specifically, it is important that this system comply with the plans for radio spectrum usage for different countries throughout the world. Although there is no standard that is common the world over, it is generally recognized that emissions at 125 kHz and below require no special licensing. Various transponder systems use this so-called "free" band.

Signal reception is accomplished via the receiver array (FIG. 28, 2403) assembly shown in schematic form in FIG. 26. As shown, this assembly comprises discrete coil segments I11–I15, which are connected together in a series fashion. This causes the array output to be the sum of the signal received by each of the coil elements I11–I15, thus maximizing the raw unprocessed signal strength. The proximal relation of the transmitter array 2401 to the receiver array 2403 allows the receiver array 2403 to be operated largely as flux sensor and less as a tuned antenna.

The signal detection scheme should be highly selective in establishing the component of the stimulus which has been received. This is partially accomplished using a bandpass filter (FIG. 27, 2701). In addition to this, synchronous demodulation may be employed to provide selectivity for coherent signals. This technique of extracting data from a noisy environment is common practice to those experienced in the art.

Vertical Sash Sensor functionality may be incorporated by connecting a Vertical Sash Sensor transmit array as an extension to the Horizontal Sash Sensor Tx array (See FIG. 27). Similarly, the corresponding Vertical Sash Sensor receiver array may be connected in series with that of the Horizontal Sash Sensor. This enables the Vertical Sash Sensor elements to be multiplexed by the same source used to sequence the Horizontal Sash Sensor. Using this scheme requires that time slots be allocated for each of the vertical sensor elements.

The receiver array output terminals, Rx– and Rx+ (FIG. 28) connects to the lead transmitter array board where it, preferably, will receive some amplification to yield "Rx––" and "Rx++". The "front-end" used as the first signal conditioning stage incorporates a bandpass filter, which helps to reject parasitic signals detected by the coil elements, and provide amplification to the signal of interest. It is desirable to maintain $R_x$––/$R_x$++ as a differential signal to minimize the impact of coupling between the line carrying the stimulus signal and the received signal.

As described above in connection with FIG. 22, the sensor array need not span the full width of the combination sash frame. Instead, the sensor length can be reduced to that of the maximum horizontal sash opening by creating three differentiated signatures for the conditions of single sash presence, presence of overlap, and no sash presence per sensor array element. Such a scheme monitors the horizontal panes as they move through the regions of the combination sash frame that all horizontal panes can be moved, Regions 2 and 3. This method of indirect displacement measurement eliminates the need for sensing in Regions 1 and 4 by correlating sash opening in Regions 1 and 4 to overlap in Regions 2 and 3.

The mis-aligned shunts 2405, 2407, 2409; 2411 depicted in FIG. 24 are composed of a magnetically permeable material, such as steel that are sized and placed in such a way that they individually overlap roughly half of the vertical dimension of each transmitter or receiver coil. In doing so, only a portion of the transmitted magnetic flux is diverted through the shunt material, so that a measurable magnetic field persists at the receiver array.

The overlap measurement scheme described need not be used if one spans a sufficient amount of the hood with the transmitter and receiver arrays, so as to be able to detect shunts on all sashes. For example, one could apply shunt segments on one corner of each sash in much the same way that point magnets are applied to the embodiment involving an array of Hall switches. In this example, the shunt elements would be of sufficient size to ensure substantial blockage of signal between a discrete transmitter element and the receiver array.

Finally, in the simplest arrangement of all, one could apply a transmitter and receiver array that covers the full width of the combination sash frame. In this embodiment, the horizontal sash panes are equipped with shunts that span the full width of each. With this scheme, the percentage of "blocked" coils detected, directly correlates to sash opening.

An alternate embodiment of the system described in connection with FIG. 27 utilizes a receiver array that is configured like the transmitter array illustrated in FIG. 26, and a transmitter array that is configured like the receiver array in FIG. 26. That is, the topologies of the transmit array and receiver array shown are reversed. In this embodiment, the transmitter array is not switched, but is operated in continuous fashion. As before, the transmitter array, which now is really one continuous element that may or may not be composed of discrete coils, is sized to span the width of the receiver array. Here, the discrete receiver coils are sampled via prescribed time slots in much the same way the transmitter coils in FIG. 29 are multiplexed.

Figure 30A:
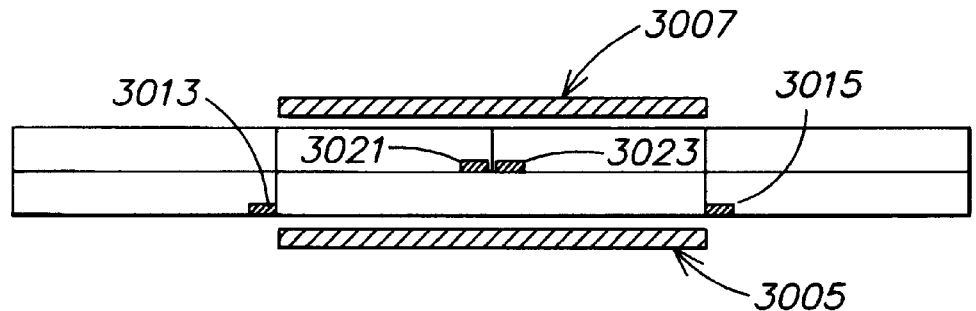
FIG. 30A is a top view of the embodiment of FIG. 30.
Figure 30:
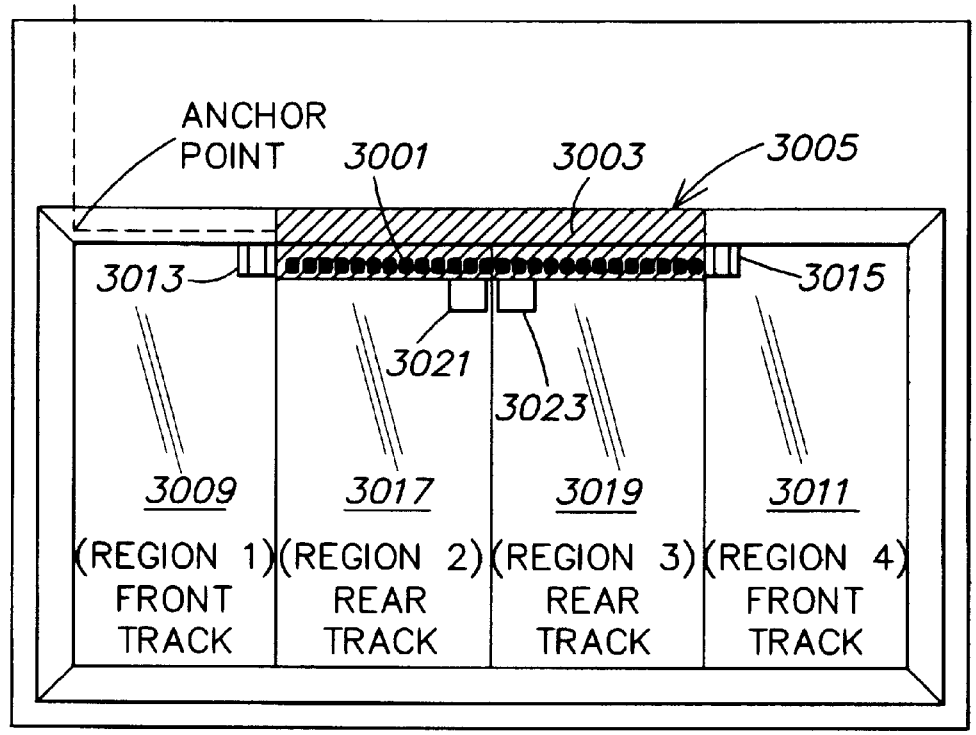
FIG. 30 is a front view of another embodiment of the invention installed on a horizontal sash fume hood.

FIG. 30 illustrates yet another embodiment in which the sensor array is composed of both Hall sensors 3001 and search coils 3003. As shown, the Hall sensors 3001 are incorporated within the transmitter array 3005. One sensor is assigned to each search coil with the array.

As is the case with the embodiment involving only search coils, a receiver array 3007 is also applied, but on the opposite side of the sash frame from the transmitter array 3005. The receiver array 3007 may be composed of individual coils that are connected together in a series circuit, or it may comprise one large coil. The receiver array 3007 connects to the transmitter array 3005 PCB via a thin two-conductor cable. The transmitter array 3005 PCB has signal-conditioning circuitry on board for the signal established by the receiver array 3007. The receiver array 3007 is used to detect emissions from each of the multiplexed transmitter coils as they are individually stimulated.

FIG. 30 shows a two-track horizontal sash assembly having two horizontal moving panes per track. Sash panes 3009, 3011 on the front track (the track closest to the transmitter array 3005) have a magnet strip 3013, 3015 applied to them. The transmitter array 3005 is sized large enough to ensure the detection of these magnet strips 3013, 3015 independent of the position of the front track panes 3009, 3011. To minimize the required transmitter array 3005 size (which translates to cost), the magnet strips 3013, 3015 are placed on the innermost edge of the sash panes 3009, 3011.

Fume hood sash arrangements having more than two panes per track would embody the same convention for the placement of the magnets on the left and rightmost panes. Sash panes appearing between the left and rightmost panes would each have a magnet strip applied either on the right or left edge of the pane. However, the placement of the magnet strip would have to be consistent for each of these middle panes. The Hall sensors 3001 which are distributed along the length of the transmitter array 3005 are used to detect the presence or location of the various track 1 sash panes 3009, 3011 by way of the permanent magnets 3013, 3015 attached to each of the panes 3009, 3011.

As shown in FIG. 30, each of the track 2 horizontal sashes 3017, 3019 include an indicator shunt. The transmitter array 3005 is sized large enough to ensure the detection of these shunts 3021, 3023 independent of the position of the rear track panes 3017, 3019. To minimize the required transmitter array 3005 size, the shunts 3021, 3023 are placed on the innermost edge of the rear track sash panes 3017, 3019, in a fashion identical to application of the magnet strips 3013, 3015 on the front sashes 3009, 3011. For fume hoods having more than two panes per track, the shunts would be applied to the rear track panes in a fashion identical to that described for the placement of magnetic strips for applications having more than two panes per track. The transmitter coils, in conjunction with the receiver array and shunts, is used to gage the position of each of the rear track sash panes.

In an obvious variation on the embodiment of FIG. 30, suggested above in connection with the description of FIGS. 24–27, the receiver array 3007 can be composed of photonic sensors. The transmitter array 3005 is then composed of photonic sources, while shunts 3021 and 3023 are simply opaque material interposed between photonic sources and photonic sensors as the sashes move.

Figure 31:
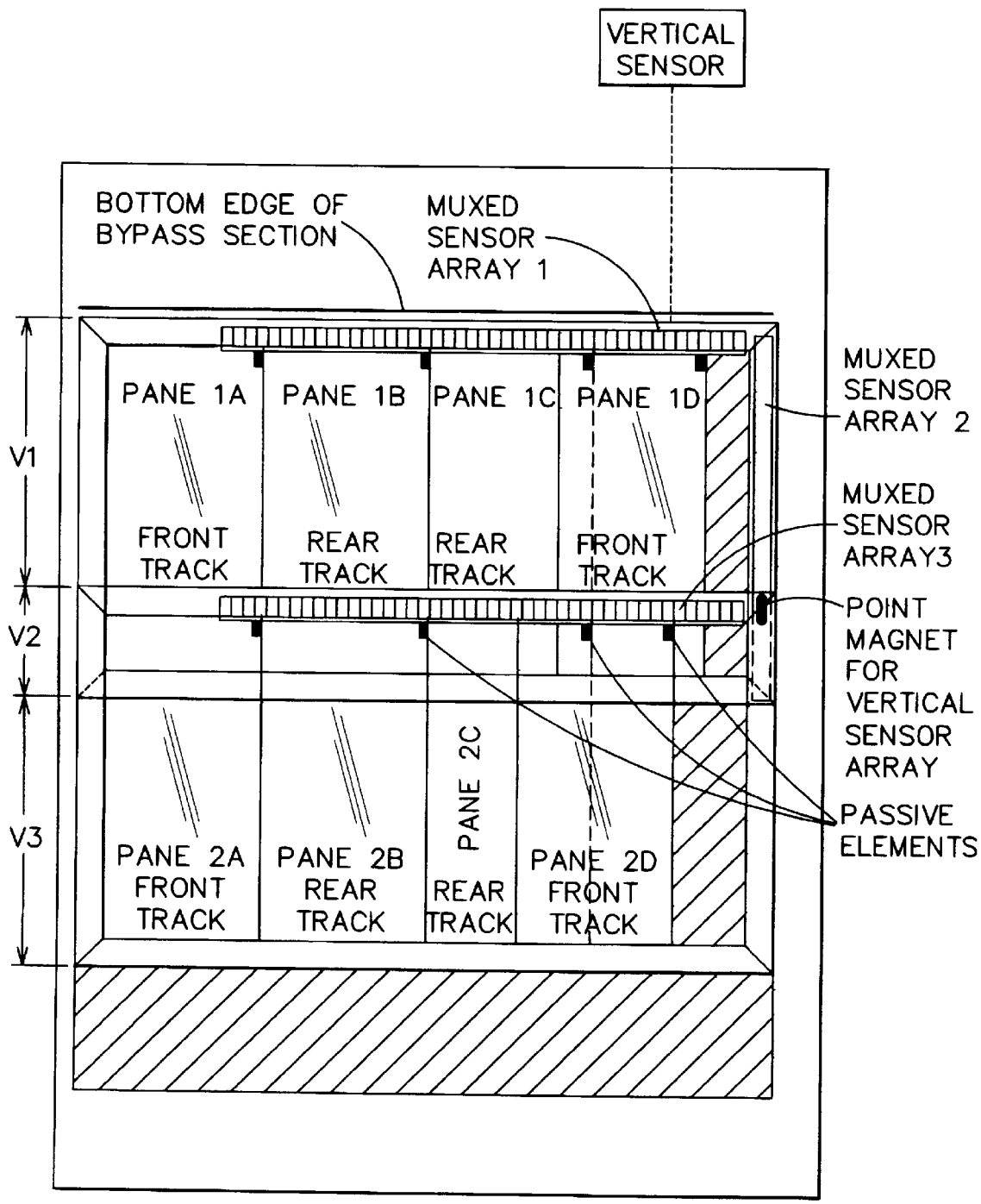
FIG. 31 is a front view of yet another embodiment of the invention installed on a combination sash fume hood.

FIG. 31 illustrates the application of multiplexed sensor arrays to a fume hood configuration that is traditionally viewed as being difficult, if not impossible, to support using prior-art sash sensing technology. This sash configuration is usually encountered on walk-in, or "full-access", fume hoods.

On more traditional hoods, such as the hood illustrated in FIG. 6, the measurement of the horizontal opening realized as a horizontal pane is moved is a function of the amount of overlap between horizontal panes, and the vertical position of the frame in which the panes reside. On the hood of FIG. 31, this relationship is further complicated by the fact that the vertical position, or overlap between the vertically moving frames, influences horizontal opening as a function of the absolute position of horizontal panes on the two combination sash frames. For example, in FIG. 31, the amount of opening to the right of Pane 2D is a function of its position in its frame, the amount by which the top and bottom frames overlap, and the amount by which pane 1D (in this case) is open. Likewise, the open area to the right of Pane 1D can be affected by Pane 2D's position. Such information cannot easily be attained via the application of prior-art sensors. Using a multiplexed array of sensors, however, enables the measurement of all three regions of horizontal sash opening.

Using MUXed Sensor Array 2, the vertical overlap distance V2 between the top and bottom frames can be established. From this, the non-overlapped distance along the lower vertical sash V3 can be ascertained. This calculation is processed by the CPU board of FIG. 1. The distance V1 from the bottom of the bypass section to the top edge of the lower sash is measured by the vertical sensor. The vertical sensor also plays a role as the top of each sash frame is allowed to travel above the bottom edge of the bypass section. Additionally, a catch is installed on the bottom sash frame so as to prevent it from passing over the top frame. Therefore, as the bottom sash is raised to fully overlap the top, as it is moved further, the two move as one; the movement beyond that point is thus registered by the element labeled vertical sensor. Alternatively, a second, differently oriented point magnet could be affixed to the bottom edge of the bypass section to indicate on sensor array 2 the position of the upper sash. Other methods of measuring the upper vertical sash position can also be used.

Using the variables V1, V2, and V3 enables the CPU board of FIG. 1 to compute horizontal opening of the various horizontal-moving panes as three separate components. The first two components are determined by the product of V1 and the horizontal dimension measured by MUXed Sensor Array 1 and, the product of V2 and the horizontal dimension measured by MUXed Sensor Array 3. The final, component is established as the product of V2 and the combined horizontal measurements by MUXed Sensor Array 1 and MUXed Sensor Array 3.

Another embodiment of the invention is based upon a variation of a wireless technology known generally as Radio Frequency Identification (RFID), and more specifically employs one of several possible passive remote sensing techniques used therein. This technology is rooted within the automated data capture market in which wireless passive transponders are gradually replacing more traditional bar code sensing devices. A system built using the technology includes at least two components: a transponder (or tag) and an inductive reader. RFID transponders are usually programmed to hold a code or identification number which can be read by the reader device.

The reader device emits an electromagnetic field typically at 125 kHz, 915 MHZ, 2.45 GHz, and 5.8 GHz which is used to stimulate and power the transponder. The transponder device is entirely battery-less, or passive.

While sufficient energy may be extracted from the field of transmission by the transponder for data retrieval, there usually is not sufficient energy for direct transmission by the transponder in response to a query by the reader. Most passive tags do not actually have a transmitter but work based on a technique known as modulated backscatter, in which electromagnetic energy that is reflected by the tag is modulated by the data to be communicated. This can be accomplished by alternately switching a load across the tag's antenna in a manner which depends on the coded data. In some cases, where there are multiple tags, the frequency of modulation will be different for each tag to be monitored, allowing for several tags to be read simultaneously; this is known as a spread spectrum response. Other methods have been utilized, such as time division multiplexing (TDM) for reading large numbers of tags simultaneously. Depending on the frequency of operation and practical tag construction, the upper limit of data communication distance is from one to fifty feet. Some of the major manufacturers of transponders and readers useable in this embodiment include: Philips Mikron, Texas Instruments (Tiris), Micron Communications, and Microchip Technologies. A few of these products include complete 8-bit microcontrollers built into the transponder, allowing for tremendous flexibility at this level.

Figure 8:
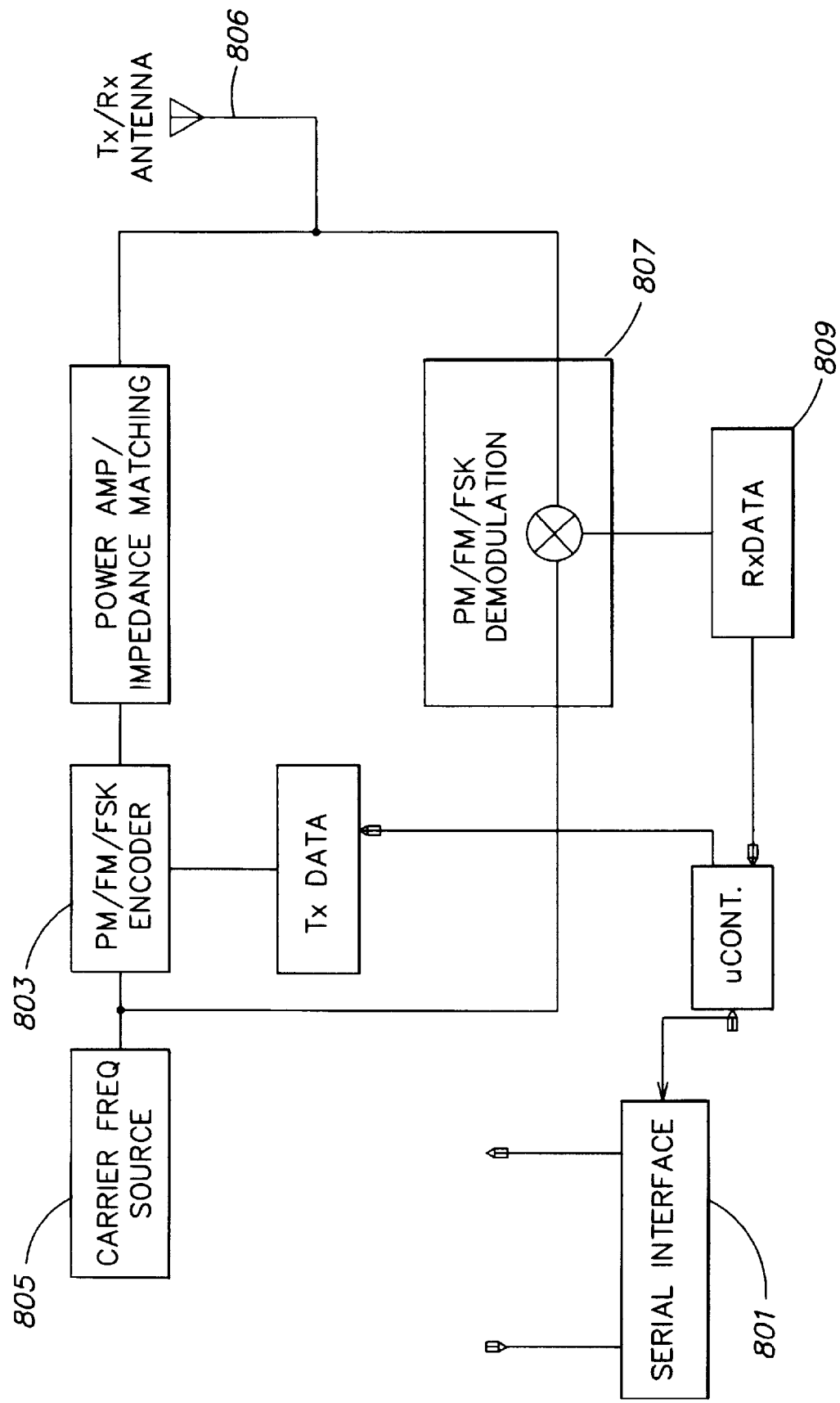
FIG. 8 is a schematic drawing of a sensor base module according to embodiments of the invention based on passive remote powered transponders (PRPTs)
Figure 9:
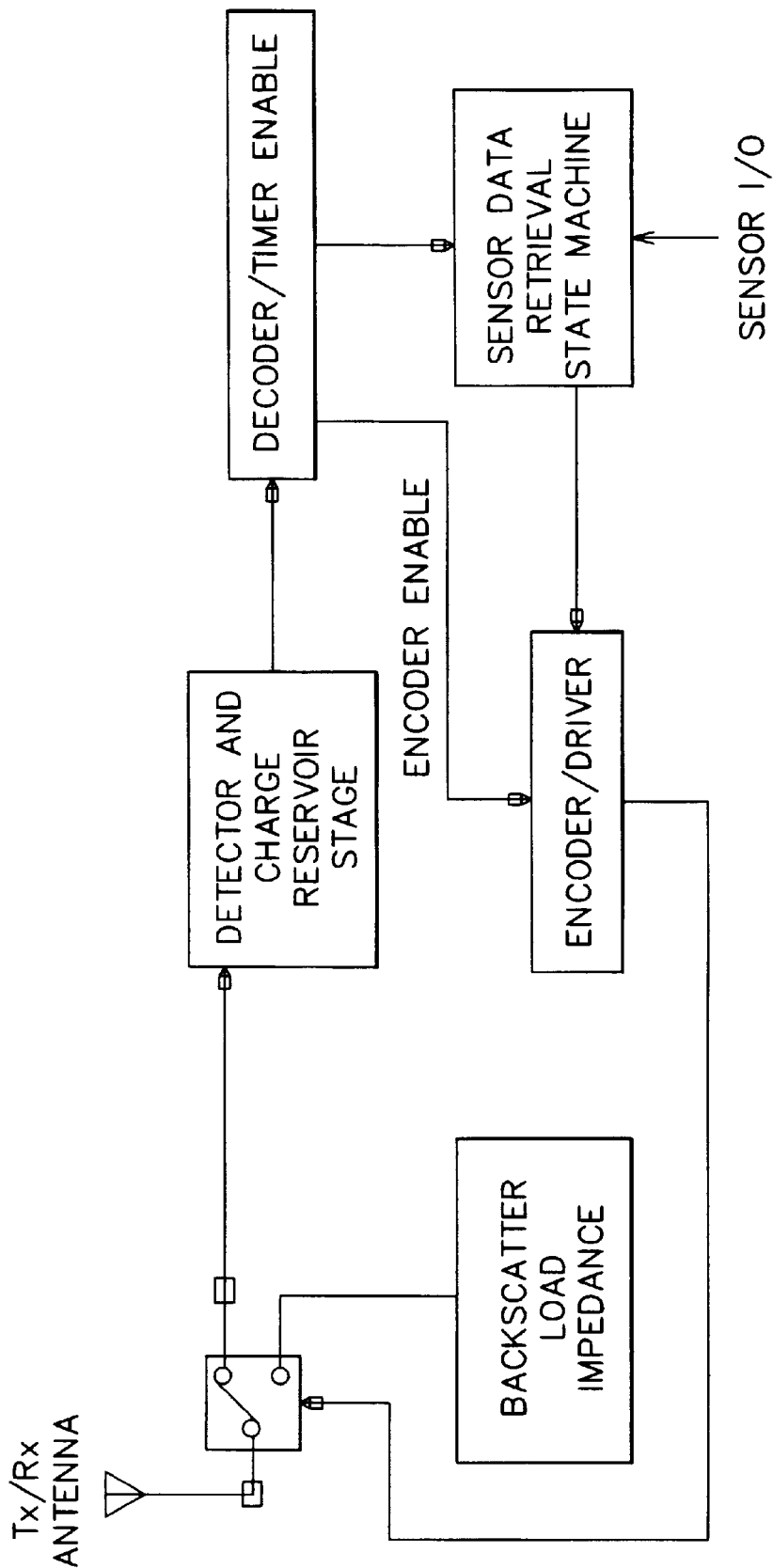
FIG. 9 is a schematic drawing of a transponder module according to embodiments of the invention based on PRPT technology.

In the embodiment using transponders, particularly passive remote powered transponders (PRPT) for sash position sensing, the tag device, or transponder, will communicate time varying data, rather than an ID code stored in memory. FIGS. 8 and 9 illustrate the major components of this concept.

Using PRPT technology eliminates sensor wires from horizontal moving panes, resulting in improved reliability, esthetics, ease of installation, and ease of commissioning of new fume hood installations. PRPT technology is more flexible, proving universal support of all hood types, sash and track count. This embodiment has improved fail-safe features derived from "smart sensor" like concepts which can define various degrees of operating status. All signal pre-conditioning and scaling can be performed at the sensor level.

The Sensor Base Module (SBM) (see FIG. 8) is the device responsible for initializing, providing energy, and detecting and decoding data from the Sensor Transponder (see FIG. 9). In that way, it will perform functions common to most commercially available readers, however, it must fulfill other requirements that are specific to sash sensing applications. This includes algebraic and ratiometric operations for the combining of signals received from multiple sensors, arbitration of communications from multiple transponders, device configuration, and connectivity to the airflow controls system.

Since an PRPT sash position sensor is an additional component to the fume hood controls system, compared to a standard horizontal sash sensor application, it is desirable that the PRPT sash position sensor possess as much of the fume hood system functionality as possible. This may include all of the fume hood monitor calibration functionality and signaling capabilities to communicate to the fume hood exhaust valve controller. Thus, the introduction of this device to a fume hood controls system may most practically be implemented in conjunction with some fundamental changes to the fume hood monitor, and the method of interfacing to the air flow control device with which it communicates.

The method of signal modulation and demodulation is not restricted to that shown in FIG. 8. However, preferred embodiments involve Frequency Shift Keyed (FSK) encoding 803, which is most suitable for the binary data transferred between transponder and sensor base module. The carrier tone 805 emitted through antenna 806 by the SBM is amplitude modulated by the transponder. Thus, the SBM receives through antenna 806 an amplitude modulated signal containing FSK encoded data, requiring two levels of demodulation 807, 809 for data extraction. Here, commercially available IC's may be used to provide the decoding function 809 following a detector stage 807. A low cost method of detecting the AM/FSK signal is described in Hewlett-Packard Application Note 1089, Designing Detectors for PRPT Tags, incorporated herein by reference.

Figure 10:
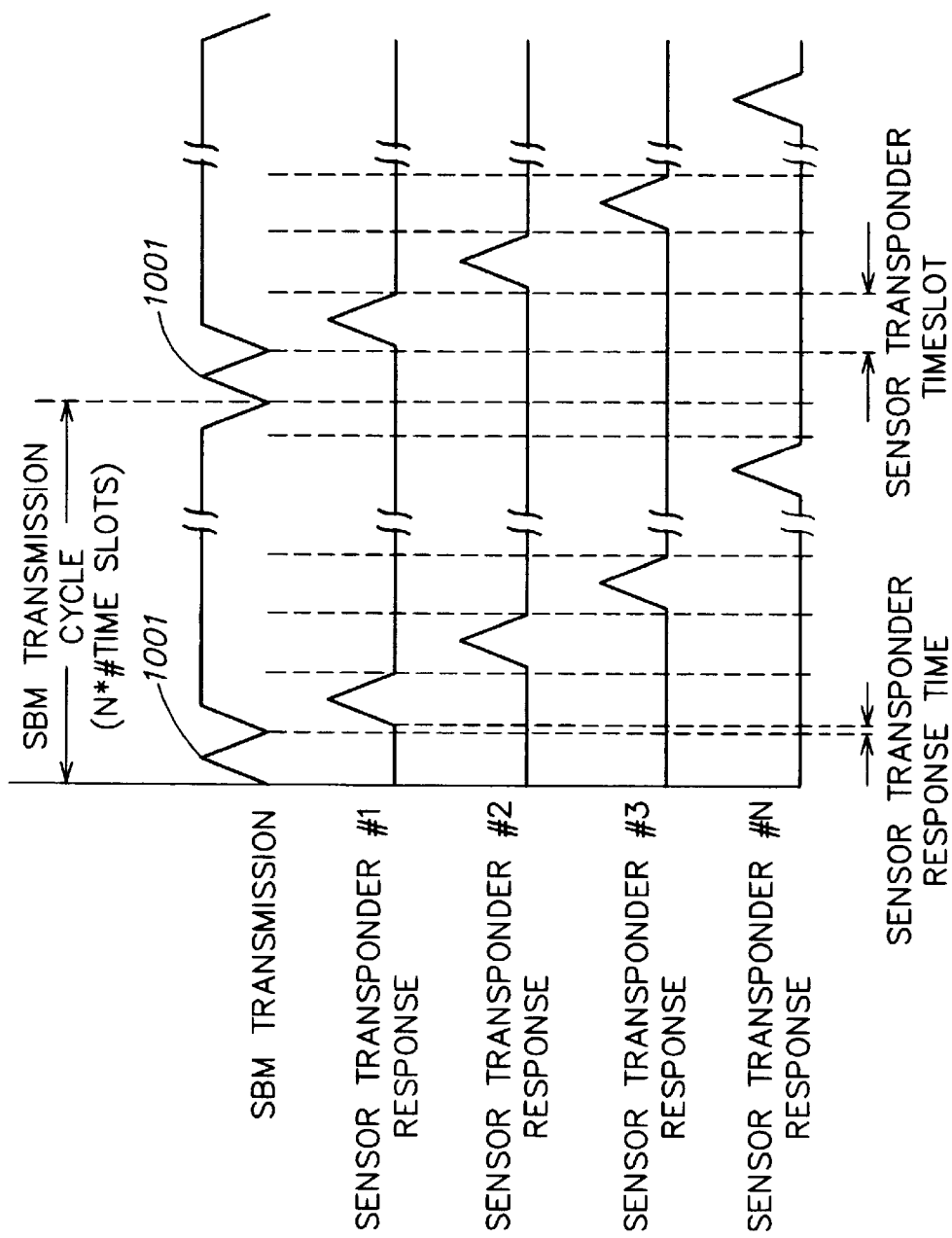
FIG. 10 is a timing diagram of an embodiment based on PRPT technology.

FIG. 10 illustrates the signaling which takes place during a basic communications cycle between the SBM and several Sensor Transponders. FIG. 10 illustrates the preferred timing relationship for communications between multiple sensor transponders and the SBM, which is based on time-division multiplexing. Another method used involves spread spectrum communications, in which a different carrier frequency is used for each transponder. The spread spectrum approach tends to be more complex and requires much more SBM hardware to handle the multiple tones emitted by the SBM, including additional detectors and down-converters required for each of the carriers. Spread spectrum systems can be more reliable; however, sometimes yielding improved signal detection. This becomes more of a concern where one is attempting communications over longer distances. The reduced detection capabilities of the FSK-based approach can easily be compensated for by proper placement and selection of SBM and transponder antennas.

A communications cycle, as is illustrated in FIG. 10, is constituted by the time duration between synchronization pulses 1001 issued by the SBM. The minimum required duration between synchronization pulses 1001 is based upon several important constraints, including transponder charge accumulation time (i.e., the time required for the transponder to store enough energy from the received signal to operate), sensor transponder timeslot time (i.e., the time for the transponder to return a data packet), and the number of transponders the system is required to support.

Table 3 illustrates a possible data packet structure for data communicated by each transponder. This data packet may be used by an FSK or spread spectrum system.

TABLE 3

| 8 bit ID | 8 bits data | status byte | CRC byte #1 | CRC byte #2 |
| --- | --- | --- | --- | --- |

Based on this packet structure, the response from each transponder includes 40 bits of data, plus a start bit if used.

The data rate of the FSK signal which emanates from the sensor transponder is dependent on the information content of the data communicated because the Space and Mark tones are at two different frequencies. The Mark tone may, for example, be at half the frequency of the Space tone. If the Mark and Space tones are chosen to be 38.4 KHz and 76.8 KHz, data rates which can easily be handled by many low cost UARTs, a packet of data will take less than 1 millisecond (plus the sensor transponder response time) to communicate to the SBM. The sensor transponder response time depends upon a number of factors which include processing at both the sensor transponder and the SBM, and is in turn entirely dependent upon both the hardware design for both transponder and SBM, and the data processing rate at the SBM receiver. However, this processing time is very small, being on the order of tens of microseconds, in comparison to the above defined signaling rates, and may be neglected for simplicity. Response time can become a significant factor, however, when considering approaches for greater throughput, requiring higher bit rates. Additionally, improvements in transponder distance of transmission may be realized by increasing bit rate.

The size of the data packet substantially determines the duration of the sensor transponder timeslots illustrated in FIG. 10. The timeslots are dispersed throughout the SBM transmission cycle so that each of the Sensor Transponders #1 through #N is able to report at a unique time during the cycle. The point during the SBM transmission cycle at which a transponder will report is determined by a timer function that is integral to the transponder circuitry, and may be either field settable or determined at the time of manufacture.

A system according to the illustrated embodiment could be designed to support up to 256 transponders, based on an 8 bit ID field, as shown in the data packet structure of Table 3. More transponders could be handled by increasing the size of the ID field. However, a system which can support about 20 transponders will be more than sufficient for most applications. Such a system would operate with an SBM transmission cycle time of about 20 milliseconds. This means that data from as many as 20 sensor transponders may be acquired in roughly 20 milliseconds.

Using modulation frequencies very close to the carrier base frequency can pose problems for AM signal detection where good resolution is required. This is not a serious problem where the data is an FSK encoded signal. Nevertheless, better performance, using traditional AM detection, can be realized by increasing the carrier frequency in relation to the FSK tone frequencies to create a more discernible envelope, resulting in less demodulation distortion.

Another method involves the AM modulation of the FSK signal at frequencies which are much greater than that of the carrier frequency emitted by the SBM. With such techniques, the carrier is viewed as noise, and may be separated from the received data by high-pass filtering techniques. This method can improve transmission range, because transmission at higher frequencies requires less power then transmission at lower frequencies.

The geometries allowable for sensors on fumehood applications permit greater freedom of packaging relative to the packaging constraints for traditional PRPT transponders. Transponders for PRPT applications tend to have stringent requirements for miniaturized packaging. For example, many of the commercially available transponders are placed in packages which are less than ¾ square inches. This complicates the antenna design for sufficient coupling between transponder and reader, and can severely limit the viable distance of transmission for these devices.

In comparison, the packaging geometries for sash sensors is very much relaxed, given the fact that the sensing device will generally span the width of the sash on which it is mounted. For typical applications, a fumehood sash will be no smaller than 1 foot in width, and will often be on the order of a couple feet in width. Thus, there is the opportunity to apply antennas which are physically much larger than those conventionally used in PRPT systems. This can result in a tremendous improvement in energy coupling between transponder and SBM.

Figure 11:
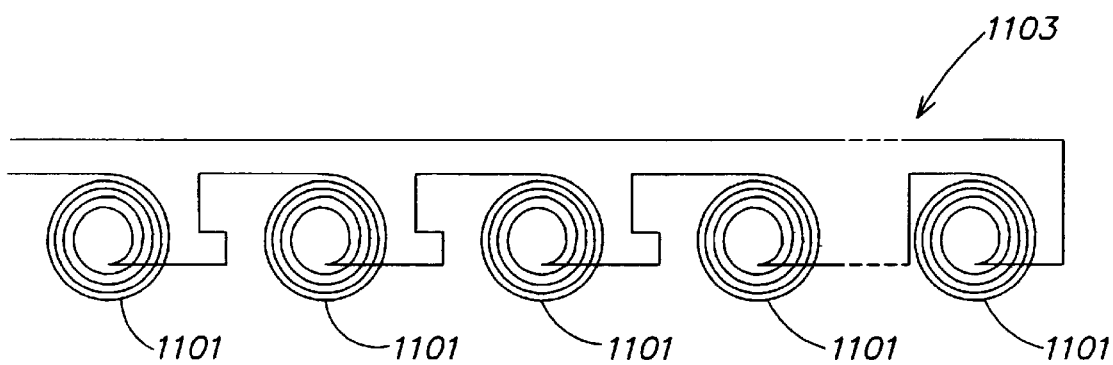
FIG. 11 is a plan view of a sensor search coil assembly useable in connection with PRPT-based embodiments of the invention.

FIG. 11 illustrates one possible embodiment of the antenna assembly for a sensor transponder. It includes a series of coils 1101 which may span the full length of the sensor bar 1103. Other embodiments may employ an antenna which comprises less of the distance of the sensor assembly. However, better coupling to the transmission source can be realized with the illustrated layout. The antenna assembly is not restricted to be a series of coils 1101, however, such a configuration can easily be assembled, while accommodating sensors of various lengths. For example, the coils may be metal traces printed on mylar, FR4 (or other popular circuit board materials), so that numerous discrete coils 1101 (along with the necessary sensing elements) appear across a common length PCB. The PCB can then be trimmed, or added to, during the time of sensor manufacture to the appropriate length called for, given specified sash width.

Figure 12:
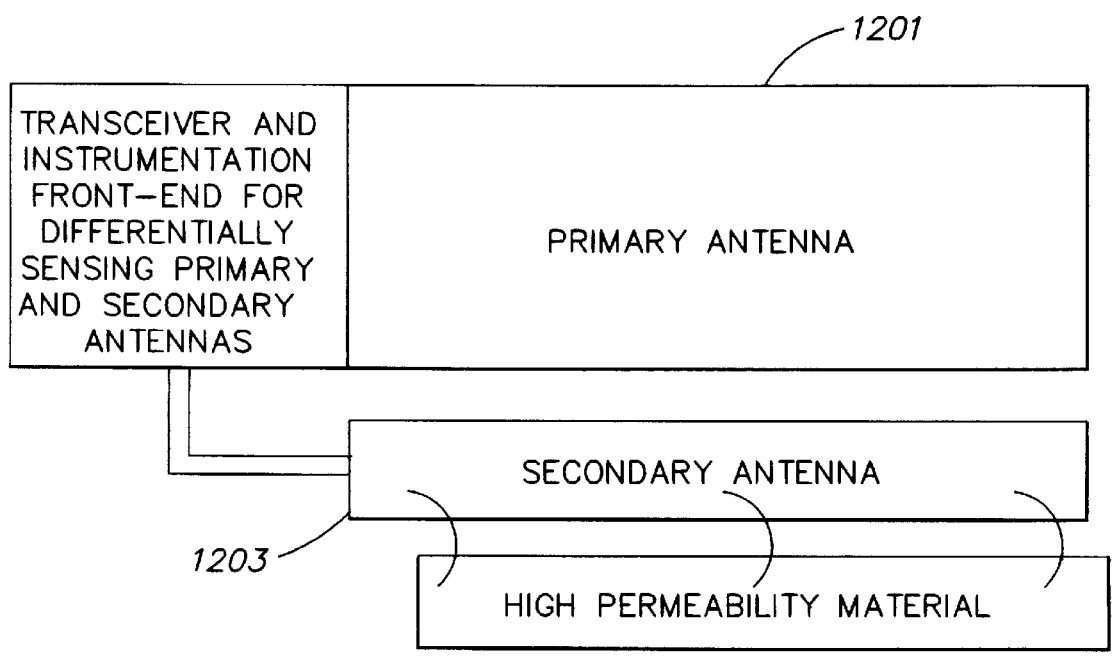
FIG. 12 is a schematic representation of the antenna arrangement according to one PRPT-based embodiment of the invention.

FIG. 12 illustrates an embodiment for position sensing which entails a primary 1201 and secondary 1203 antenna for the combined purposes of supplying energy to the transponder from the SBM, communications, and sash position sensing. Each of the two antennas may be configured according to FIG. 11; however, they need not have the same number of turns per coil, as only one antenna is required to deliver power to the transponder electronics. The SBM carrier signal is a stimulus to the transponder for producing the raw sensing signal. Here, the antennas 1201, 1203 are positioned on a first fume hood sash in a co-planer fashion, while laterally positioning the two so that one is physically placed above the other. The long dimension of the sensor bar (FIG. 11, 1103) is arranged in the direction which a second sash whose opening is to be detected moves. The second sash has affixed thereto a segment of highly permeable material, such as iron, and whose shape matches that of the secondary antenna. The highly permeable material is placed laterally on the sash so that the percentage overlap between the Secondary Antenna and the high permeability material is representative of the percentage overlap between the sashes.

The permeable material augments the coupling between the SBM transmitter antenna and the secondary antenna 1203, resulting in a positive acting signal at the secondary antenna 1203 that is linearly proportional to the overlap between antenna and permeable material, when taken in relation to the signal detected by the primary antenna 1201. Using two antennas 1201, 1203 compensates for variations in coupling between sensor transponder antennas 1201, 1203 and the SBM transmitter antenna, which occur when the distance between them varies as the fume hood sashes are moved. It is possible to eliminate one of the two transponder antennas 1201, 1203 if a substantially uniform SBM carrier field can be established in relation to the transponder antennas 1201, 1203. One way of accomplishing this is by distributing the SBM antenna along, for example, the top of the hood opening.

For the method of FIG. 12, the sash overlap is established by the following expression:

$$PercentOverlap = \frac{SecondaryAntennaSignal \pm Offset}{PrimaryAntennaSignal}$$

Another sensing method which utilizes the SBM carrier signal as a stimulus entails a primary sensor transponder and a secondary transponder, or beacon. The primary transponder may comprise the antenna arrangement of FIG. 12, which is mounted on a first sash. On a second sash whose overlap is to be measured in relation to the first sash, a secondary transponder, having antenna coils fashioned with a shape to match the profile of the primary transponder assembly, is laterally placed so that the percentage overlap between the secondary and primary transponders is representative of the percentage overlap between the sashes.

The primary transponder in this embodiment communicates with the SBM in much the same fashion as has been previously discussed. The secondary transponder, however, is designed to operate strictly as a "beacon" or signal source to be used as a reference by one or more primary transponders installed on the fume hood. However, like the primary transponder, the beacon utilizes the SBM carrier signal as its energy source for operation.

Figure 13:
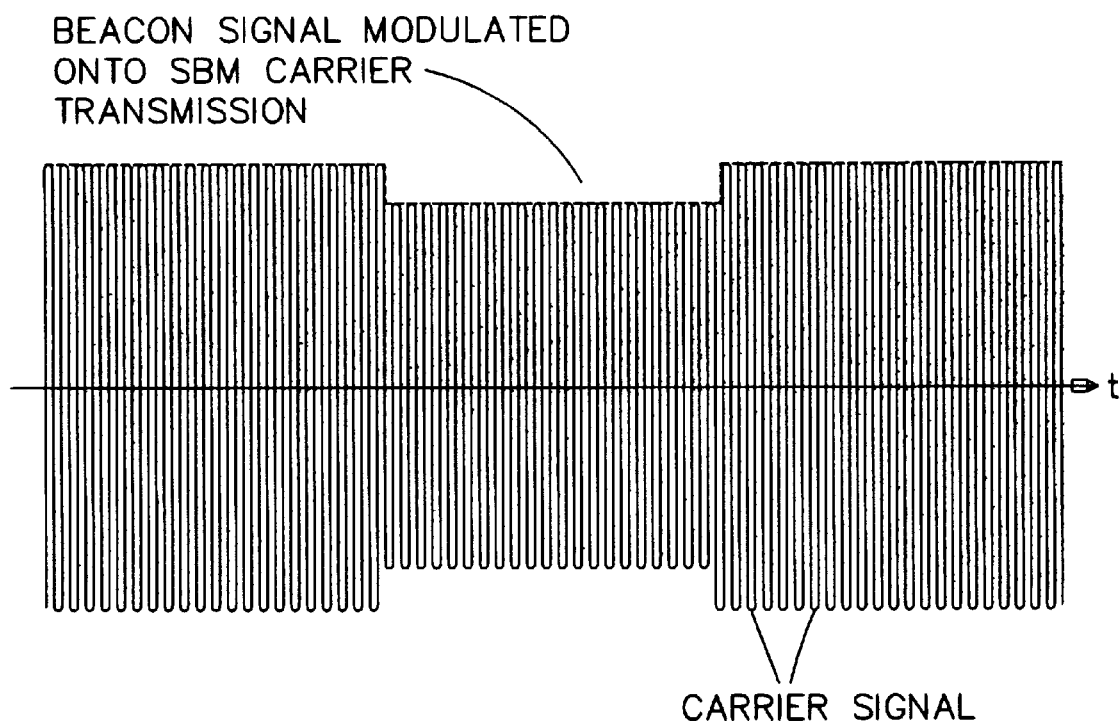
FIG. 13 is a waveform diagram of the modulated sensor base module carrier signal.
Figure 14:
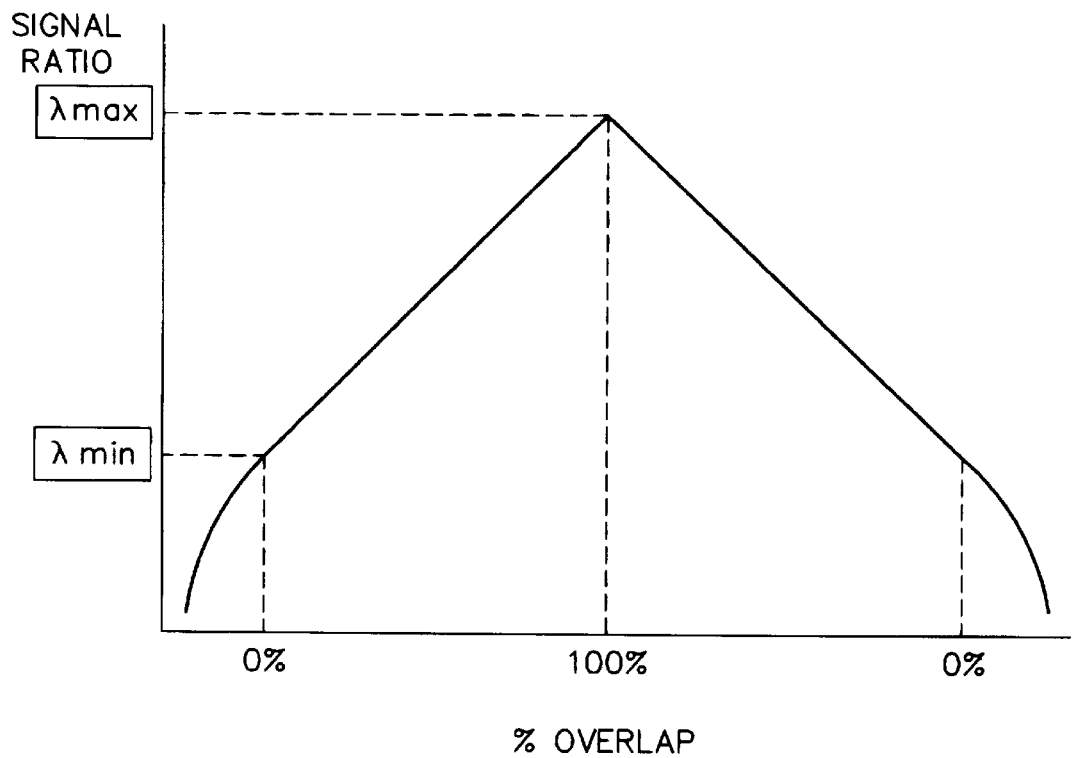
FIG. 14 is a plot of percent of overlap versus beacon tone peak amplitude for a PRPT-based embodiment of the invention.

Both the primary transponder and beacon are equipped with a down counter that establishes a tone that is a fraction of the carrier frequency, and is synchronized in reference to the SBM synch pulse. Since this signal is derived from the same source, i.e. from the SBM carrier, by both the primary transponder and beacon, they are substantially synchronized. The tone derived at the beacon is used to amplitude modulate the carrier as shown in FIG. 13. This presents a low-level signal that is received by the sensor transponder when the beacon is in close proximity and, at that point, is synchronously demodulated using the SBM derived tone as a reference. What results is a signal from the beacon at a frequency that is equivalent to the reference tone, but with an amplitude that has a correlation to the amount of physical overlap between sensor and beacon, i.e., sash opening, when taken in relation to the amplitude of the SBM carrier signal. The overlap between sashes is expressed as a function of signal ratio, as shown in FIG. 14.

In this embodiment for position sensing, the sensor transponder will report to the SBM the peak value of both the SBM carrier signal received and the demodulated tone from the beacon. The amplitude of the SBM carrier is used to compensate for variations in the magnitude of the envelope of the modulated signal from the beacon, as the beacon's position is varied in relation to the SBM transmitter.

Figure 17:
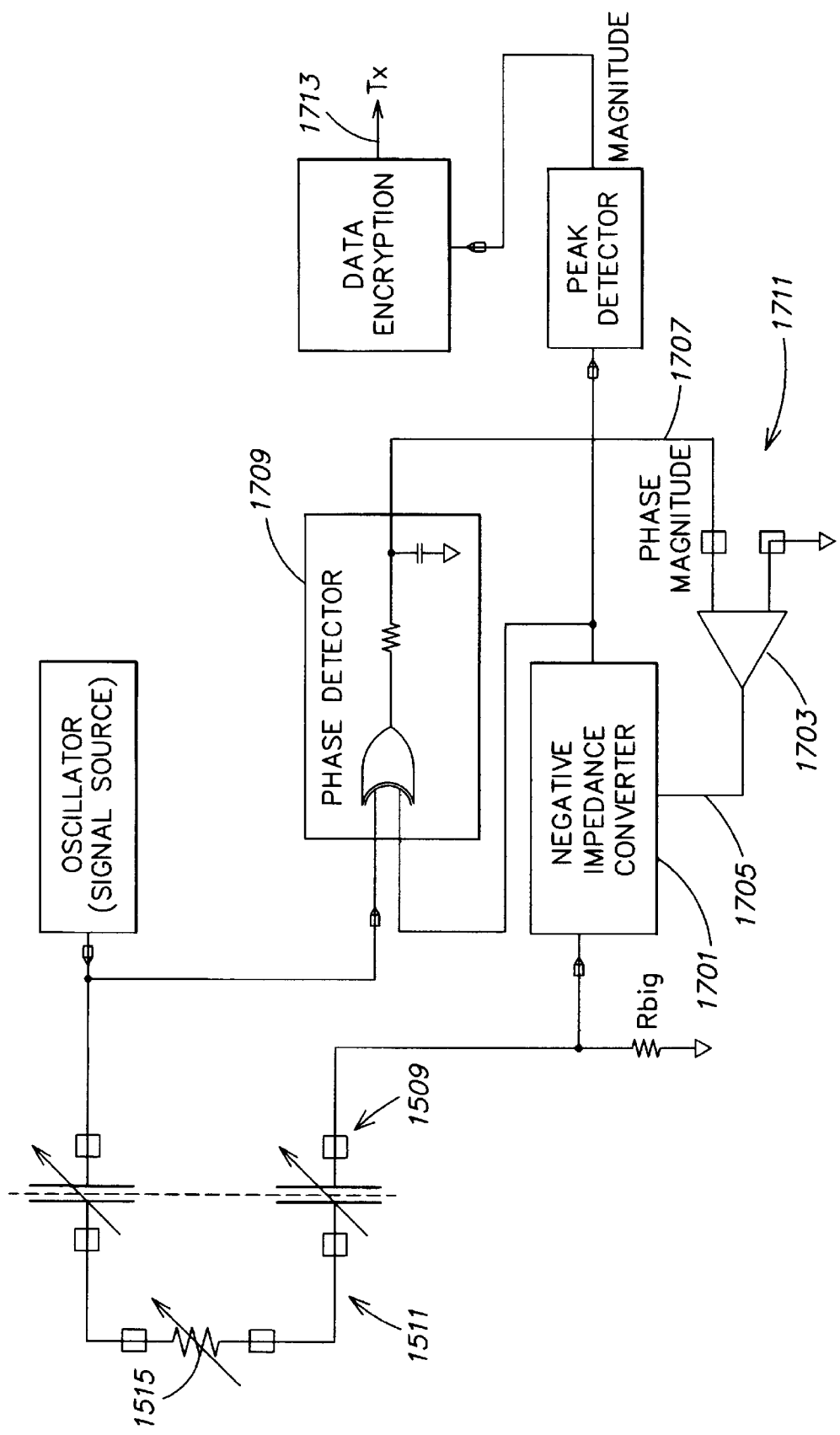
FIG. 17 is a schematic drawing of a second sensor assembly using the sensor strips of FIGS. 15a and 15b.
Figure 18:
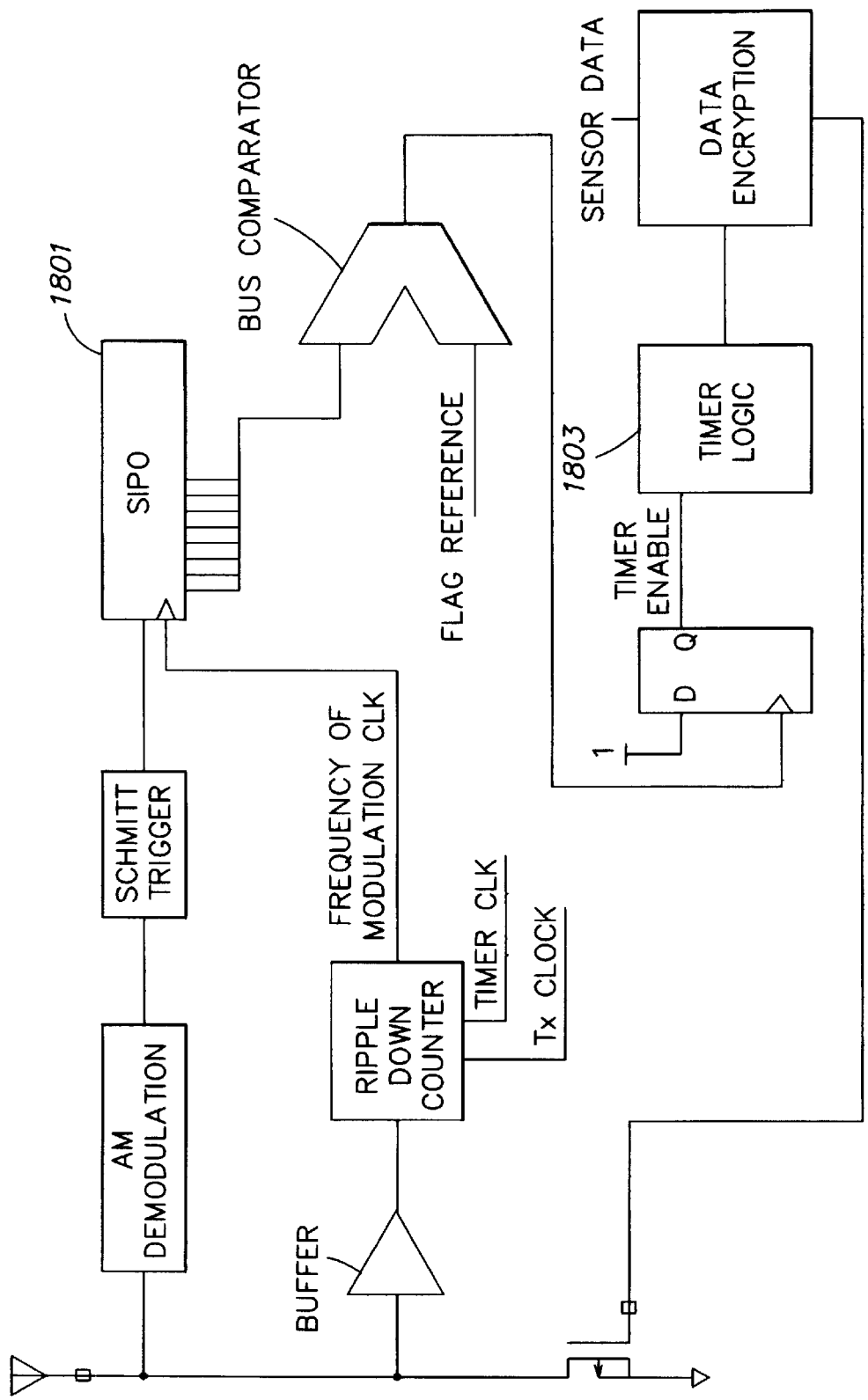
FIG. 18 is a schematic drawing of a third sensor assembly using the sensor strips of FIGS. 15a and 15b.

Another wireless sensor approach which offers better signal integrity than the aforementioned embodiment, involves electrostatically or capacitively coupled sensor elements. The major components of such embodiments are illustrated in FIGS. 17 and 18.

Figure 15A:
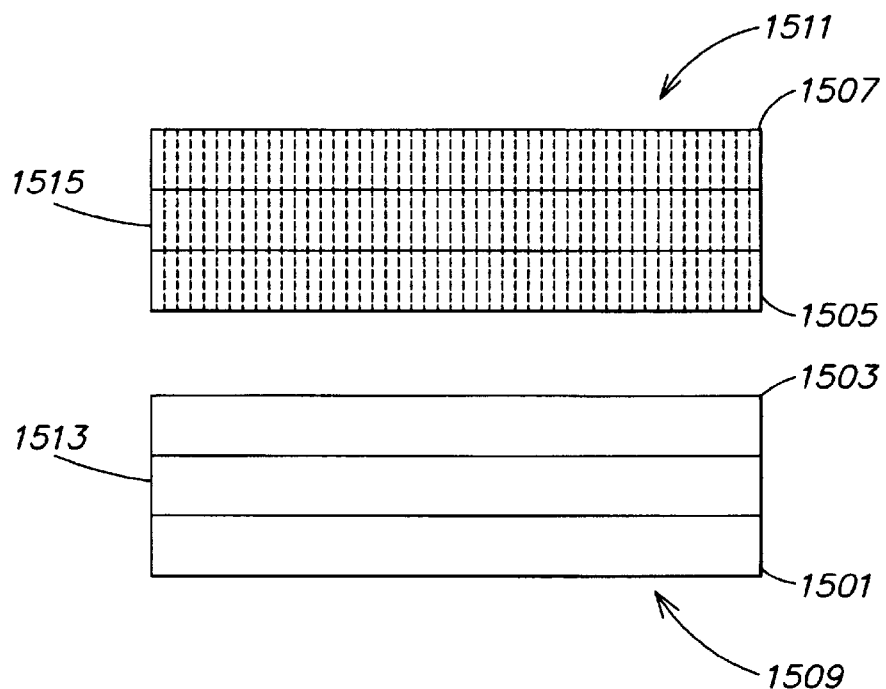
FIG. 15a is an exploded plan view of sensor strips useable in a capacitance-based embodiment of the invention.

FIG. 15a shows an arrangement of two sets of electrodes 1501, 1503, 1505, 1507, or conductive plates. One electrode assembly 1509, 1511 is required on each of the two sashes whose overlap is to be measured. Electrodes 1501 and 1503, isolated by an insulator 1513 from each other are affixed to a first sash. Electrodes 1505 and 1507 are affixed to a second sash in an opposing relationship to electrodes 1501 and 1503, respectively. Electrodes 1505 and 1507 are connected by a resistive material 1515 or discrete resistors (not shown). The opposing electrodes act as variable capacitors, their values varying based on the amount of overlap between the two sashes. As is the case with any capacitive sensing scheme, the variation in capacitance results in a change in impedance that correlates with the measurement parameter of interest. However, since the capacitance formed by the parallel plates is also a function of the size of the air gap between them, such a mechanism by itself will not provide satisfactory results. This is due to the variability of this air gap with vibration and regular sash movement.

Figure 15B:
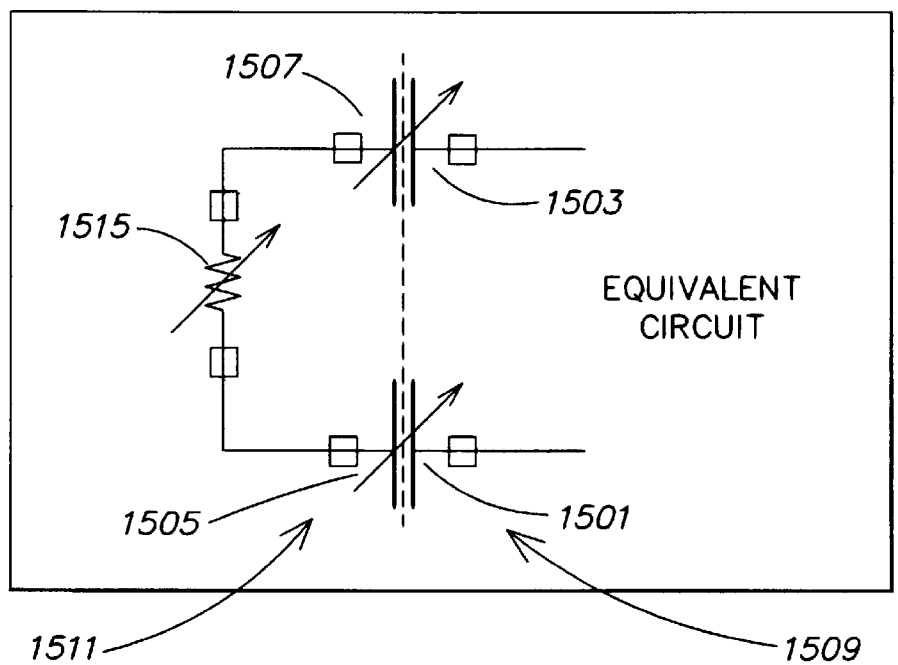
Figure 16:
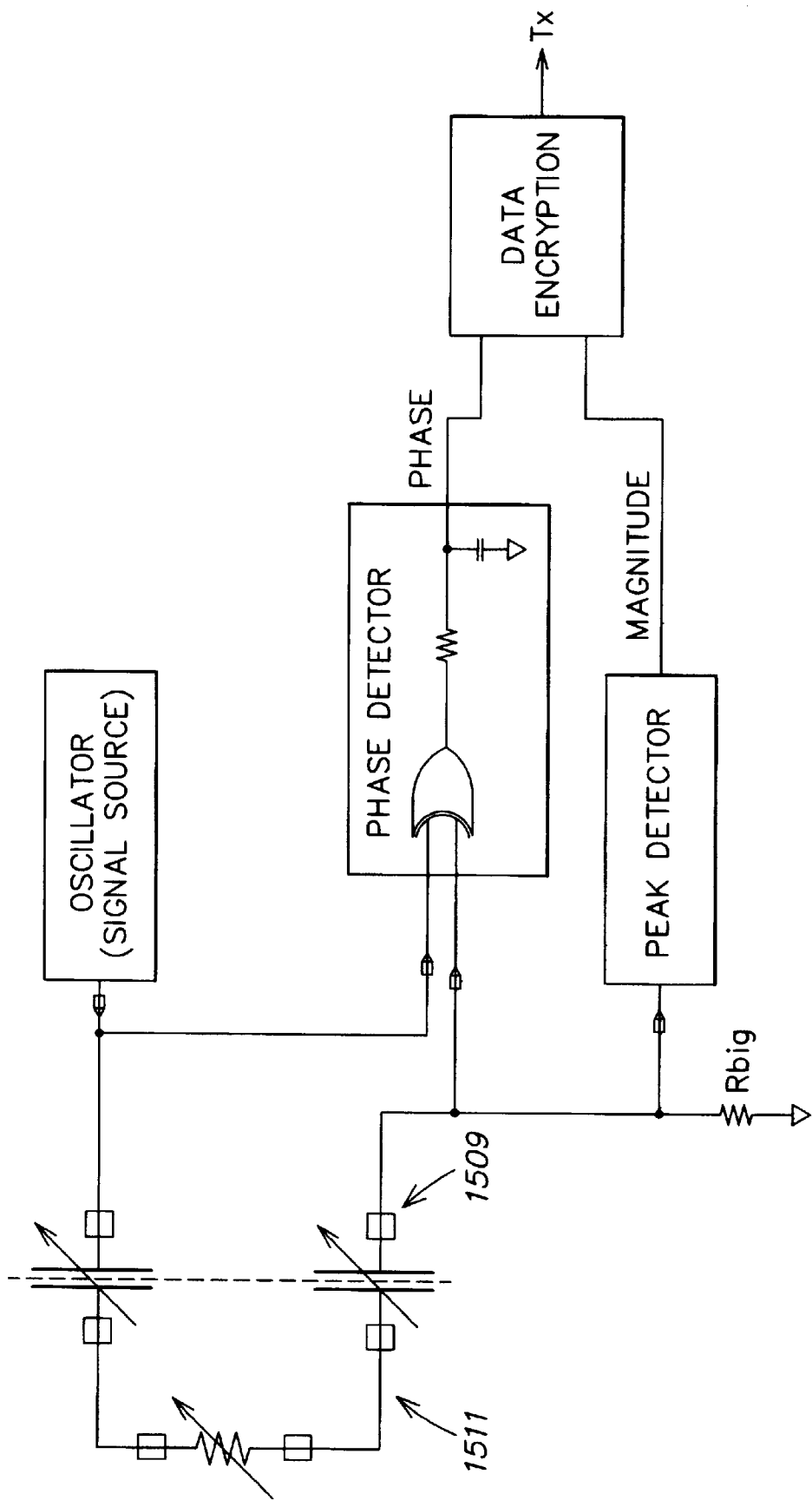
FIG. 16 is a schematic drawing of a sensor assembly using the sensor strips of FIGS. 15a and 15b.

Therefore, the sensing approach does not rely solely on the value of the capacitance realized with overlap. A resistive component, resistive material 1515 has been incorporated into the sensor strip 1511. FIG. 15b gives the equivalent circuit of these elements in operation. The purpose of the resistive element 1515 is to provide a non-reactive, i.e. real, phasor component to the transfer characteristics of the sensor network. This real term is independent of the airgap between sashes, and may easily be decomposed by the circuit components shown in FIG. 16. With this type of capacitive based sensing the capacitance only serves as a coupling mechanism for the stimulus signal.

The resistive material 1515 incorporated with the sensor strip 1511 may be thin-film resistors that are electrodeposited on the strip material, or discrete surface mounted resistors may be used. Either approach may be taken to provide a sensor strip that is extremely thin.

To isolate overlapped sensor portions from portions of the sensor strip which have not been overlapped by the Sensor Transponder Electrodes, the sensor strip electrodes are composed of numerous discrete isolated elements. The size of the discrete electrode and resistive elements defines the resolution of the sensor. This is because, while capacitance varies substantially linearly with the amount of overlap between electrodes, resistance varies by discontinuous increments corresponding to each new pair of electrodes forming a capacitance as the overlap is changed.

The resistive term varies non-linearly with sash overlap. This characteristic, however, is highly repeatable, so that sash overlap could easily be extracted computationally, or via a look-up table. This function would most logically be carried out at the SBM, since phasor decomposition will likely occur in the SBM as well.

FIG. 17 illustrates an alternate method of extracting the real signal component from the sensor network. This method places a variable negative impedance converter (NIC) 1701 in series with the sensor elements 1509, 1511 to provide phasor cancellation with the capacitive reactance of the sensor. The NIC's impedance, which can be made to be largely inductive (i.e., it is an active inductance), is controlled by the op amp 1703 output 1705, based on a feedback signal 1707 representing phase that is derived from the phase detector 1709. The control loop 1711 acts to provide dynamic cancellation of the reactive elements, yielding a signal that is proportional to the sensor resistance 1515. The advantage to this approach is that it reduces the variables which must be communicated to the SBM via output 1713, which simplifies the SBM and sensor transponder operation.

Instead of coupling capacitively, a similar approach can be used with inductive coupling. For such a method, the electrodes on both the sensor transponder and sensor strip of FIG. 15 would be replaced with discrete miniature coil elements. Depending on coil geometry limitations, this approach can result in a higher degree of coupling, resulting in less dependence on the distance of the air gap, to the resistive elements, which results in better signal integrity and improvements to dynamic range.

It is possible to simplify the sensor transponders by reducing their functional requirements for communications. FIG. 18 illustrates a simplified transponder scheme which reduces the receiver and transmitter function to a very simple state machine. This can have significant advantages over a microcontroller-based arrangement, in terms of a reduction in power consumption. Power consumption of the sensor transponder electronics has a profound impact on antenna design geometries and cost, feasibility of transmission range, and operation within the acceptable limits for a non-licensed emitter of electromagnetic radiation. With the arrangement of FIG. 18, a circuit topology which draws a few tens of microamps can be realized. The key to such low power consumption is the embodiment of much of the logic hardware via programmable logic technology such as programmable logic arrays, etc.

Note that the bit pattern which is compared at the output of the serial in/parallel out device 1801 in FIG. 18 may be taken as a general op code which synchronously activates the transponder. Because the transponder may be in a field of other such devices, a timer 1803 is incorporated for the time partitioning of the responses from various units back to the SBM. This timer may be omitted if the SBM is made to query each available device. This sort of poll/poll-response method would utilize a unique op-code with each sensor transponder.

Figure 19:
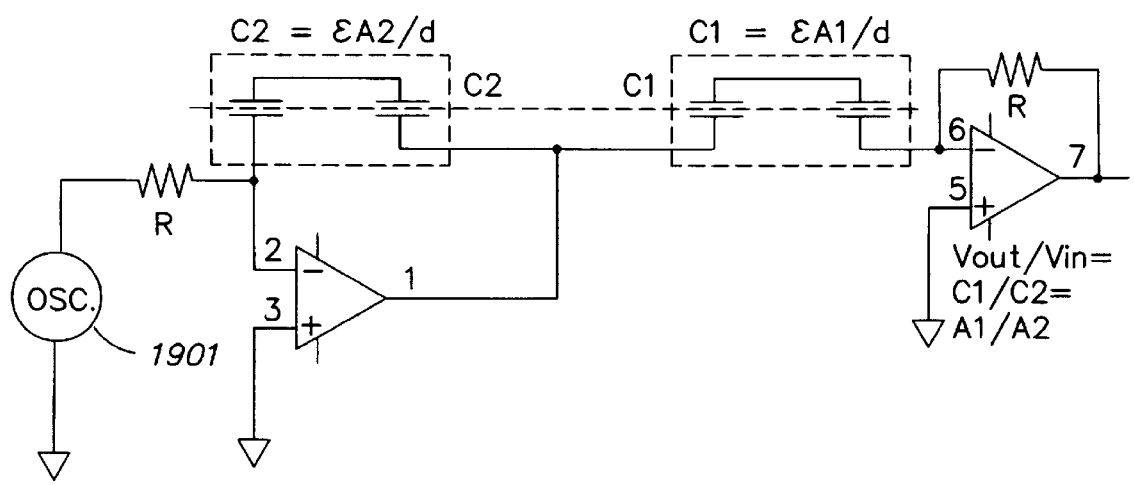
FIG. 19 is a schematic drawing of a fourth sensor assembly using the sensor strips of FIGS. 15a and 15b.

FIG. 19 illustrates a portion of the instrumentation required to perform differentially-based capacitive sensing. This approach involves two pairs of electrodes like those shown in FIG. 15; one serving as a reference for the other. The circuit of FIG. 19, virtually eliminates any dependencies on the airgap separation (d) between electrodes because the airgap separation (d) is a common-mode parameter to both capacitances (C1 and C2). This circuit applies a gain term to the input stimulus 1901 that is proportional to the ratio of the areas (A1/A2) of the two pairs of electrodes. Thus, for purposes of generating a linear signal, the electrodes must be fashioned so that the ratio of their areas is a linear function with overlap.

Having described illustrative embodiments of the invention, it should be understood that while the invention has been particularly shown and described with reference to these embodiments, various modifications in form or detail may be made therein by one skilled in the art, while remaining within the spirit and scope of the invention, which is to be determined only by properly construing the following claims.

What is claimed is:

1. A sash sensor for a sash in a frame, comprising:
   an array of multiplexed sensor elements; and
   at least one indicator element which interacts with two or more sensor elements of the array of sensor elements to affect a signal detected thereby.

2. The sensor of claim 1, wherein the at least one indicator element is at least one passive element.

3. The sensor of claim 2, further comprising:
   a signal source positioned to direct a radiated signal toward the array of sensor elements in a direction where the signal is affected by the at least one passive element.

4. The sensor of claim 3, wherein the at least one passive element is disposed between the array of sensor elements and the signal source.

5. The sensor of claim 4, wherein the radiated signal is electromagnetic, and the at least one passive element is conductive.

6. The sensor of claim 2, wherein the at least one passive element is a magnet and the multiplexed sensor elements are suitable for measuring time-invariant magnetic fields.

7. The sensor of claim 6, wherein the magnet is mounted to the sash and the array is mounted to the frame.

8. The sensor of claim 6, wherein the sensor elements are Hall effect switches whose state is affected by the magnet.

9. The sensor of claim 8, wherein each Hall effect switch has an enable input connected to receive an enable signal and each Hall effect switch has an output, the sensor further comprising:
a circuit corresponding to each Hall effect switch, the circuit having an output connected to the Hall effect switch enable input, which enables the Hall effect switch when at least one of the enable signal is received and the Hall effect switch output is asserted.

10. The sensor of claim 9, wherein the circuit is a microprocessor.

11. The circuit of claim 9, wherein the circuit further comprises:
an OR gate having inputs connected to receive the enable signal and the Hall effect switch output, and an output connected to the Hall effect switch enable input.

12. The sensor of claim 11, further comprising:
a NAND gate having inputs connected to receive the Hall effect switch output and the enable signal, and having an output representing a state of the Hall effect switch when enabled.

13. The sensor of claim 2, wherein the array of multiplexed sensor elements is mounted to the frame and the at least one passive element is mounted to the sash.

14. The sensor of claim 1, further comprising:
a signal source positioned to direct a radiated signal toward the array of sensor elements in a direction where the signal is affected by the at least one indicator element.

15. The sensor of claim 14, wherein the at least one indicator element is disposed between the array of sensor elements and the signal source.

16. The sensor of claim 15, wherein the indicator element is mounted to the sash and the array and the signal source are mounted in opposing relationship to each other on the frame, with the indicator element interposed between them.

17. The sensor of claim 15, wherein the radiated signal is electromagnetic, and the at least one passive element is conductive.

18. The sensor of claim 17, wherein a frequency of the radiated signal is less than 125 kHz.

19. The sensor of claim 13, wherein the radiated signal is photonic and the at least one indicator element is substantially opaque.

20. The sensor of claim 14, wherein plural multiplexed signal sources each direct a radiated signal to a common receiver element, and wherein the signals are affected by the indicator element.

21. The sensor of claim 20, wherein the at least one indicator element is disposed between the array of sensor elements and the signal source.

22. The sensor of claim 21, wherein the indicator element is mounted to the sash and the array and the signal source are mounted in opposing relationship to each other on the frame, with the indicator element interposed between them.

23. The sensor of claim 14, wherein plural signal sources each direct a radiated signal to plural multiplexed receiver elements, and wherein the signals are affected by the indicator element.

24. The sensor of claim 23, wherein the at least one indicator element is disposed between the array of sensor elements and the signal source.

25. The sensor of claim 24, wherein the indicator element is mounted to the sash and the array and the signal source are mounted in opposing relationship to each other on the frame, with the indicator element interposed between them.

26. The sensor of claim 2, further for sensing positions of plural sashes in the frame, wherein the array of multiplexed sensors is mounted to one of the plural sashes and the at least one passive element is mounted to another of the plural sashes.

27. The sensor of claim 2, further for sensing positions of plural sashes in the frame, wherein the array of multiplexed sensors is mounted to the frame and the at least one passive element is mounted to at least one of the plural sashes.

28. The sensor of claim 27, wherein the at least one passive element further comprises plural passive elements.

29. The sensor of claim 28, wherein the plural passive elements are mounted to the plural sashes and wherein the plural passive elements possess a characteristic whereby one sash is distinguishable from another.

30. The sensor of claim 29, farther comprising:
a processor which computes overlap between the sashes based upon the characteristic distinguishing one sash from another.

31. The sensor of claim 30, wherein the sensor array spans less than a full distance over which a sash can move, and the processor further computes sash opening from the overlap computed.

32. The sensor of claim 29, wherein the plural passive elements are magnets mounted in differing magnetic orientations.

33. The sensor of claim 2, further for sensing positions of plural sashes in the frame, and the array of multiplexed sensor elements being a first sensor array, the sensor further comprising:
another array of multiplexed sensor elements being a second sensor array, the first sensor array and the second sensor array connected in series and multiplexed as one continuous sensor array.

34. The sensor of claim 33, wherein the plural sashes include at least one horizontal sash mounted in at least one vertical sash, and wherein the first sensor array is mounted to measure horizontal sash position of the horizontal sashes and the second sensor array is mounted to measure vertical sash position.

35. The sensor of claim 34, further comprising:
a second vertical sash including a second plurality of horizontal sashes;
a third sensor array connected in series with and multiplexed as one continuous sensor array with the first and second sensor arrays, the third sensor array mounted to measure horizontal sash position of the second plurality of horizontal sashes.

36. The sensor of claim 35, further comprising:
a processor which computes sash open area in response to vertical sash position reported by the second sensor array and the horizontal sash positions reported by the first and third sensor arrays.

37. The sensor of claim 36, further comprising:
a vertical sensor having an output which reports a position of the second vertical sash to the processor; wherein
the processor determines from the second sensor array an overlap (V2) between the at least one vertical sash and the second vertical sash, and a non-overlapped distance (V3) of the second vertical sash;
the processor determines from the vertical sensor and the overlap (V2), a non-overlapped distance (V1) from a top edge of the second vertical sash to a bottom edge of a bypass section and a lower open area;

the processor determines from the non-overlapped distance (V1) and the horizontal sash position reported by the third sensor array, a first upper open area;

the processor determines from the non-overlapped distance (V3) and the horizontal sash position reported by the first sensor array, a second upper open area;

the processor determines from the overlap (V2) and the horizontal positions reported by the first and third sensor arrays, a third upper open area; and the processor determines the total sash open area as a sum of the lower open area, the first upper open area, the second upper open area and the third upper open area.

38. The sensor of claim 2, wherein the at least passive element is a passive remote powered transponder (PRPT).

39. The sensor of claim 38, wherein each PRPT encodes as an output signal an indication of strength of an impinging signal.

40. The sensor of claim 39, wherein plural PRPTs are mounted to move in conjunction with each sash pane.

41. The sensor of claim 40, wherein the PRPTs are powered by an external source of energy coupled to the PRPTs electromagnetically.

42. The sensor of claim 41, wherein the PRPTs are powered by an external source of energy coupled to the PRPTs electrostatically.

43. A method of sensing a sash within a frame, the method comprising:

receiving a signal at a plurality of positions along the frame; and detecting an effect on the signal detected of a passive element which moves when the sash moves; wherein the step of receiving is multiplexed so the signal is independently detected at each position.

44. The method of claim 43, wherein the multiplexing is in time.

45. The method of claim 44, wherein the multiplexing is in frequency.

46. The method of claim 43, further comprising:

providing as the passive element a magnet whose constant field is the signal.

47. The method of claim 43, further comprising:

supplying as the signal a time-varying signal.

48. The method of claim 47, wherein the passive elements are passive remote transponders powered and queried by the time-varying signal supplied.

49. The method of claim 48, wherein the sash overlaps another sash, the method further comprising:

computing overlap between the sashes based on responses received from the passive remote transponders.

50. The method of claim 47, further comprising:

varying the signal received during the step of receiving by varying a position of the passive element when the sash moves.

\* \* \* \* \*